(12) United States Patent
Shin et al.

(10) Patent No.: US 9,733,767 B2
(45) Date of Patent: Aug. 15, 2017

(54) MOBILE TERMINAL AND CONTROLLING METHOD THEREOF

(71) Applicant: LG ELECTRONICS INC., Seoul (KR)

(72) Inventors: Hangsoo Shin, Seoul (KR); Jaewon Kim, Seoul (KR)

(73) Assignee: LG Electronics Inc., Seoul (KR)

(*) Notice: Subject to any disclaimer, the term of this patent is extended or adjusted under 35 U.S.C. 154(b) by 544 days.

(21) Appl. No.: 14/173,572

(22) Filed: Feb. 5, 2014

(65) Prior Publication Data

US 2015/0062069 A1    Mar. 5, 2015

(30) Foreign Application Priority Data

Sep. 4, 2013    (KR) .................... 10-2013-0106354

(51) Int. Cl.
    *G09G 1/00*      (2006.01)
    *G06F 3/044*      (2006.01)
    *G06F 3/041*      (2006.01)

(52) U.S. Cl.
CPC ............ *G06F 3/044* (2013.01); *G06F 3/0418* (2013.01)

(58) Field of Classification Search
CPC ................. G06F 3/043; G06F 3/0433; G05B 2219/25187; G05B 2219/25196; H04N 2201/0084; H04N 5/23293; G06T 2200/24; G06T 2207/20144; G09G 5/02; G09G 5/024
See application file for complete search history.

(56) References Cited

U.S. PATENT DOCUMENTS

| | | | | |
|---|---|---|---|---|
| 8,050,142 B2 * | 11/2011 | Hara | ...................... | H04N 5/232 367/131 |
| 2011/0183720 A1 * | 7/2011 | Dinn | ...................... | G06F 1/1626 455/566 |
| 2012/0146924 A1 * | 6/2012 | Inoue | ..................... | G06F 3/0418 345/173 |
| 2012/0249470 A1 * | 10/2012 | Sugiura | ................. | G06F 1/1694 345/174 |
| 2013/0176268 A1 * | 7/2013 | Li | ........................... | G06F 3/044 345/174 |

\* cited by examiner

*Primary Examiner* — Michael Faragalla
(74) *Attorney, Agent, or Firm* — Dentons US LLP

(57) ABSTRACT

A mobile terminal and controlling method thereof are disclosed, by which a water mode can be automatically entered in a manner of periodically monitoring a capacitance value of a touchscreen. The present invention includes an electrostatic touchscreen and a controller, if at least one of a size of a capacitance value detected through the touchscreen and a variation of a per-region capacitance value detected through the touchscreen meets a first condition, entering a water mode for disabling a touch control function of the touchscreen.

17 Claims, 19 Drawing Sheets

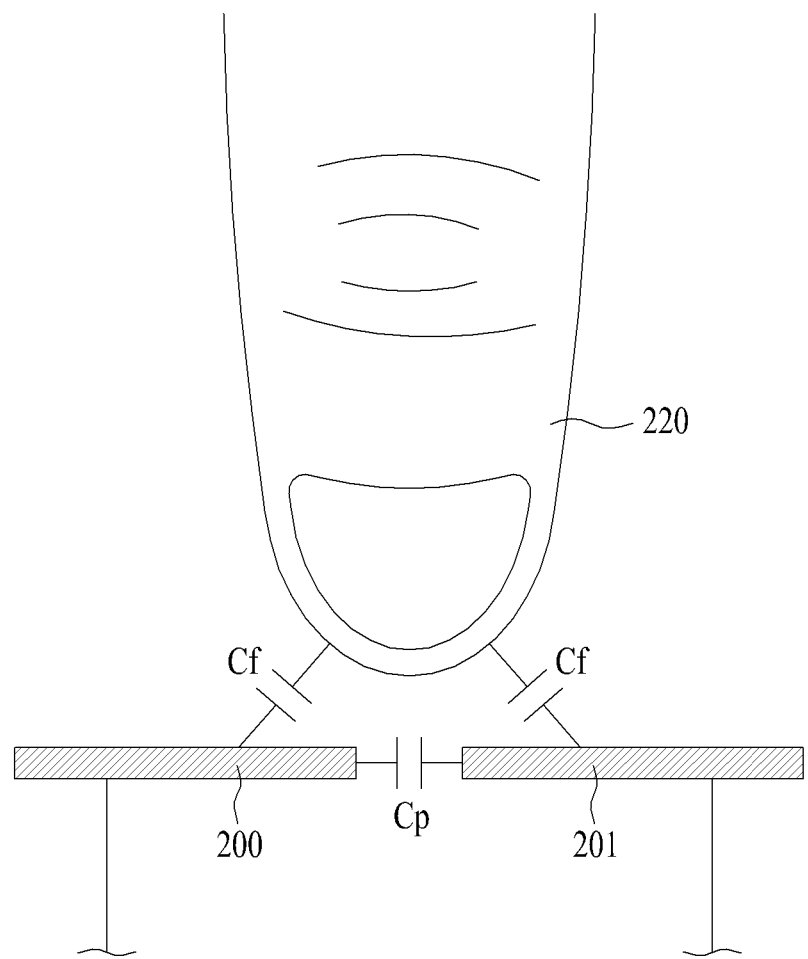

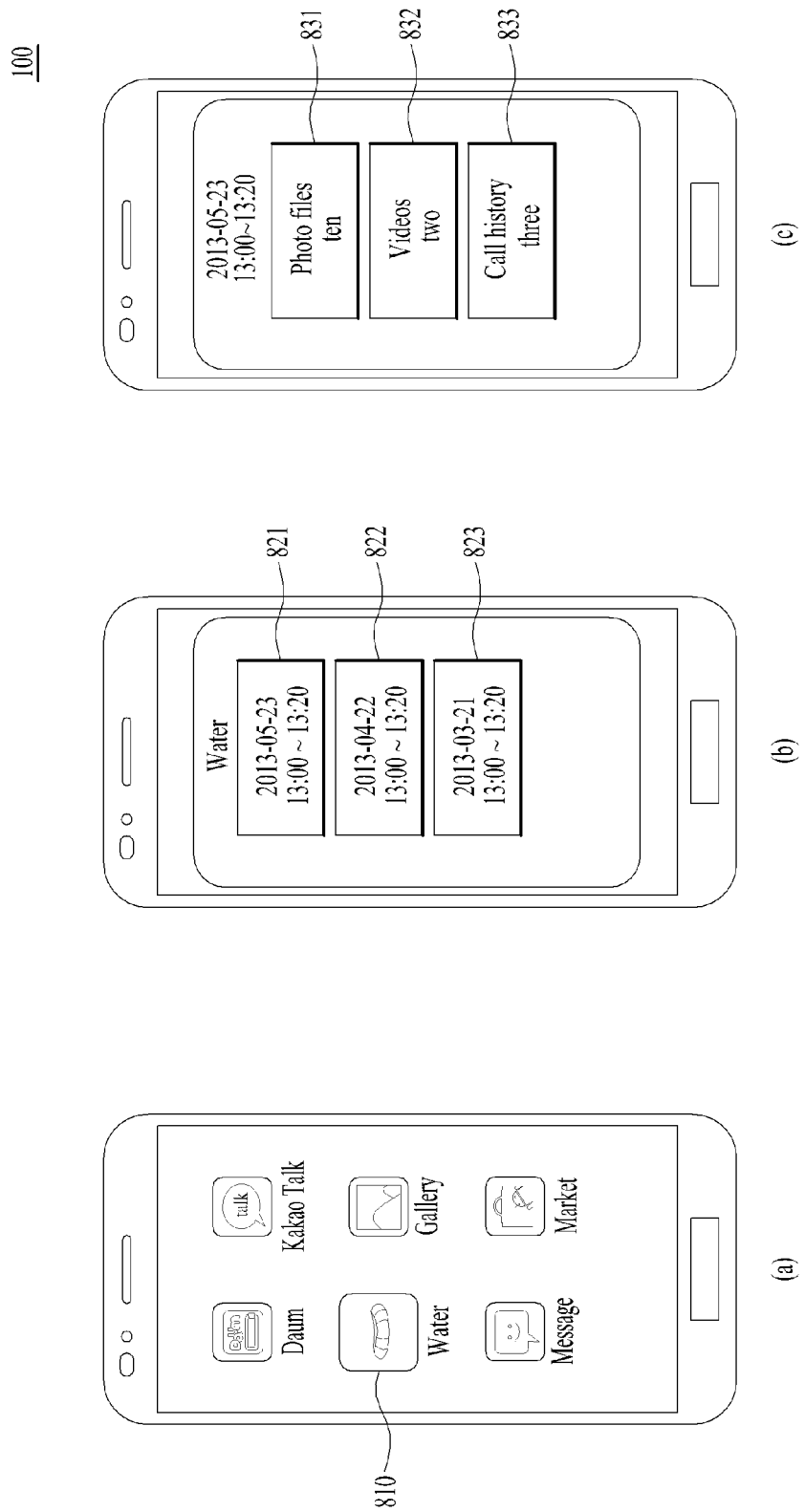

MOBILE TERMINAL AND CONTROLLING METHOD THEREOF

Pursuant to 35 U.S.C. §119(a), this application claims the benefit of earlier filing date and right of priority to Korean Application No. 10-2013-0106354, filed on Sep. 4, 2013, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Currently, a terminal equipped with a waterproof function is designed to maintain its performance in case of being used by being dried after having been dipped in water during 20 to 30 minutes. Yet, such a terminal is devised to prevent malfunctions only in case of falling into water but is not working in the water.

Meanwhile, ongoing efforts are made to research and develop a terminal usable in the water in a manner that a mode of the terminal is manually set to a water mode before entering the water. However, it is still inconvenient for a user to set or release the water mode of the terminal one by one.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a water mode can be automatically entered in a manner of periodically monitoring a capacitance value of a touchscreen.

Another object of the present invention is to provide a mobile terminal and controlling method thereof, by which a user experience and user interface for enhancing user's convenience in a water environment can be implemented.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include an electrostatic touchscreen and a controller, if at least one of a size of a capacitance value detected through the touchscreen and a variation of a per-region capacitance value detected through the touchscreen meets a first condition, entering a water mode for disabling a touch control function of the touchscreen.

In another aspect of the present invention, a method of controlling a mobile terminal according to one embodiment of the present invention may include the steps of determining whether at least one of a size of a capacitance value detected through a touchscreen and a variation of a per-region capacitance value detected through the touchscreen meets a first condition and if the first condition is met as a result of the determining step, entering a water mode for disabling a touch control function of the touchscreen.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 3 is a diagram to describe variation of capacitance in case of applying a touch to an electrostatic touchscreen;

FIG. 19 is a diagram to describe one example for a method of managing an activation result of an application or specific function previously activated in water mode by saving the activation result as a separate folder.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
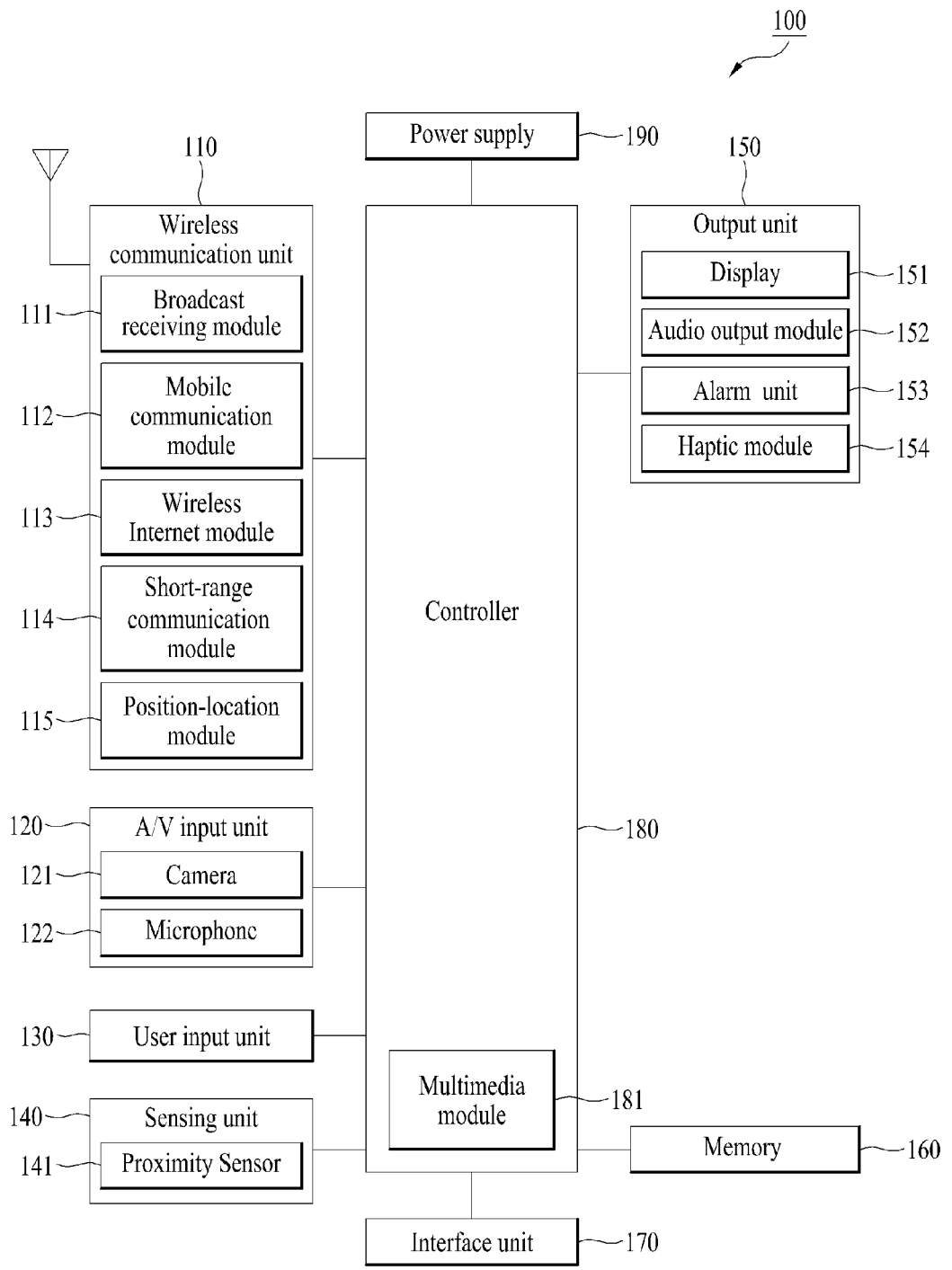
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
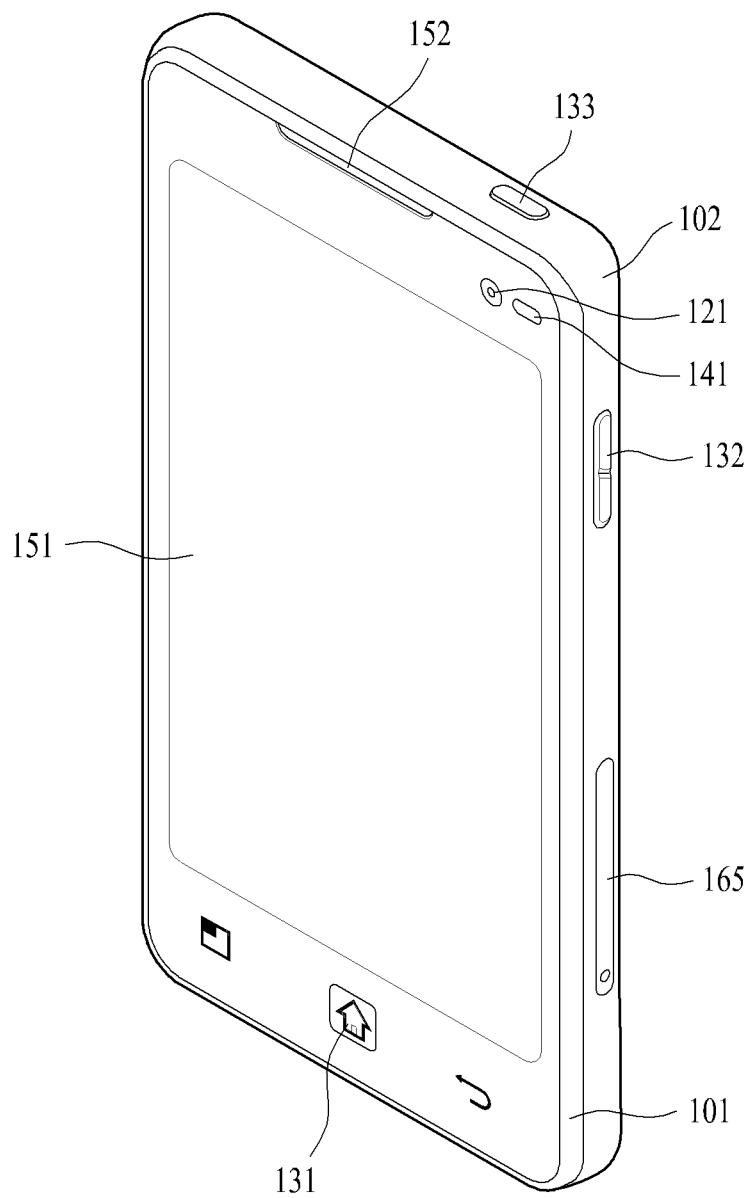
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
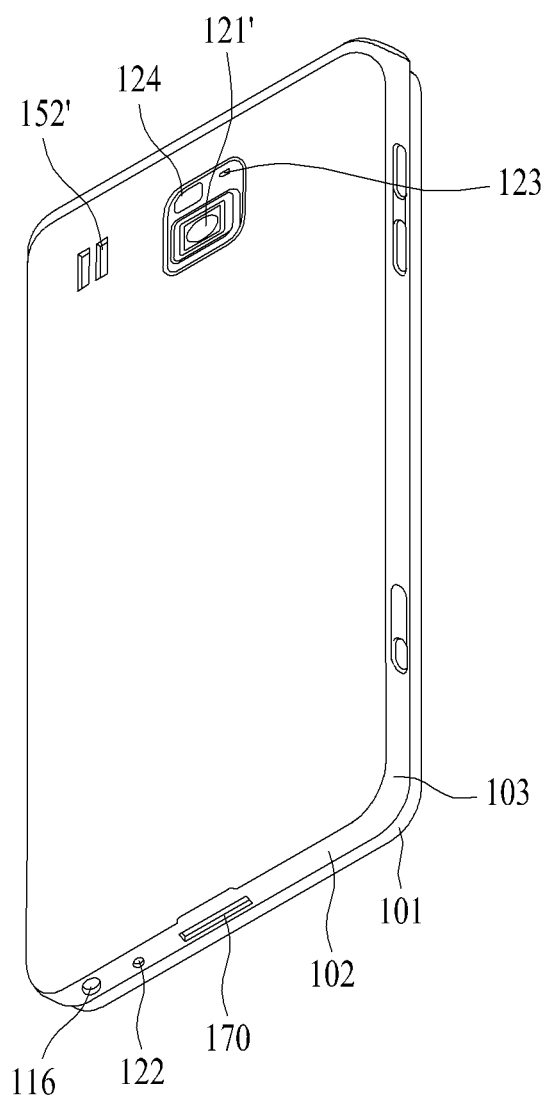
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad for detecting a touch can be additionally provided to the rear case 102. The touchpad can be configured in a light transmittive type like the display 151. In this case, if the display 151 is configured to output visual information from its both faces, it is able to recognize the visual information via the touchpad as well. The information outputted from both of the faces can be entirely controlled by the touchpad. Alternatively, a display is further provided to the touchpad so that a touchscreen can be provided to the rear case 102 as well.

The touchpad is activated by interconnecting with the display 151 of the front case 101. The touchpad can be provided in rear of the display 151 in parallel. The touchpad can have a size equal to or smaller than that of the display 151.

In the following description, embodiments related to a controlling method implemented in the above-configured mobile terminal 100 are explained with reference to the accompanying drawings.

For clarity and convenience of the following description, assume that a mobile terminal 100 mentioned in the following description includes at least one of the components shown in FIG. 1. In particular, a mobile terminal 100 according to the present invention may include the user input unit 130, the display unit 151, the memory 160 and the controller 180. In some cases, the mobile terminal 100 according to the present invention may further include the proximity sensor 141. If the display module 151 includes a touchscreen 151, implementation of the following embodiments of the present invention may be further facilitated. Therefore, the following description is made on the assumption that the display module 151 includes the touchscreen 151. Moreover, if the user input unit 130 includes the touch sensor 137, the touchscreen 151 may be usable as the user input unit 130.

According to the present invention, the mobile terminal 100 may become a sender terminal or a receiver terminal depending on a corresponding embodiment.

The mobile terminal according to one embodiment of the present invention includes an electrostatic touchscreen 151 and a controller 180. Modules configuring the mobile terminal 100 are described in association with embodiments of the present invention as follows.

FIG. 3 is a diagram to describe variation of capacitance in case of applying a touch to an electrostatic touchscreen. In particular, capacitance of a capacitive part working as a capacitor in the touchscreen 151 is described in detail with reference to FIG. 3 as follows.

Basically, referring to FIG. 3, in the touchscreen 151, a contact point is formed between conductive substances 200 and 201 and a prescribed parasitic capacitance $C_p$ exists in-between. If the touchscreen 151 is touched with a conductive substance, e.g., if the touchscreen 151 is touched with a user's finger 220, a prescribed capacitance $C_f$ is generated between the finger 200 and each of the conductive substances 200 and 201. Hence, if a touch is applied to the touchscreen 151, a total capacitance value of the capacitive part of the touchscreen 151 becomes a sum of the $C_p$ value and the $C_f$ value, thereby becoming greater than that of a case in the absence of a touch.

Referring now to FIG. 1, the controller 180 can determine whether a touch is applied in a manner of analyzing information on a time or count for charging the capacitive part in the touchscreen 151. In some cases, the determination of a presence or non-presence of the touch may be made by a touch control unit separately provided to the touchscreen 151. For clarity, assume that the above-mentioned analysis and determination are performed by the controller 180.

Generally, a capacitance value is not even over a whole region on the touchscreen due to various reasons including properties, manufacturing tolerances, use environment and the like of the substances configuring the touchscreen 151 and a variation exists in a capacitance value per region. If the touchscreen 151 comes in contact with water, since the water is electrically conductive like a user's hand, a prescribed capacitance is generated between the water and each of the conductive substances 200 and 201. Hence, the capacitance value becomes relatively even on the water contacted region on the touchscreen 151.

Therefore, a solution according to the present invention is provided as follows. First of all, it is determined whether the mobile terminal 100 is in a water environment using the property of the capacitance value detected through the touchscreen coming in contact with water. Secondly, if it is determined that the mobile terminal 100 is in the water environment, a water mode can be entered without a procedure for a user to set the water mode separately.

In the following description, if a mode of the mobile terminal 100 is set to enter an environment appropriate for operating underwater, such a mode shall be named a water mode. If a mode of the mobile terminal 100 is set to operate normally except the water mode, such a mode shall be named a normal mode.

If at least one of a size of a capacitance value detected through the touchscreen 151 and a variation of a per-region capacitance value detected through the touchscreen 151 meets a first condition, the controller 180 enters a water mode for disabling a touch control function of the touchscreen 151.

In this case, the first condition may include one of a condition that a capacitance of each prescribed region on the touchscreen 151 is equal to or smaller than a preset value, a condition that a capacitance difference between prescribed regions on the touchscreen 151 is equal to or smaller than a preset value, and a condition that a difference between a capacitance value of a region having a maximum capacitance and a capacitance value of a region having a minimum capacitance value among prescribed regions on the touchscreen 151 is equal to or smaller than a preset value. If the touchscreen 151 comes in contact with water, capacitance values of regions on the touchscreen 151 in contact with the water are evenly distributed in a range equal to or smaller than a prescribed value in general. In this case, the prescribed regions may include a plurality of random regions on the touchscreen 151 and may be distributed evenly on the touchscreen 151, by which the prescribed regions may be non-limited.

If the first condition is met, the controller 180 enters the water mode for disabling the touch control function of the touchscreen 151. Namely, if the touch control function of the touchscreen 151 is not disabled, the touch control function may malfunction as if there is a user's touch to the region on the touchscreen coming in contact with water. In the water mode, a user can input a user command through the user input unit 130 including the keys 131 and 132. For example, the keys 131 and 132 can be hardware keys.

As soon as or after entering the water mode, the controller 180 can control the camera 121 to be activated. Since a user generally attempts to use the camera 121 of the mobile terminal 100 in such a water activity place as a swimming pool and the like, if the water mode is entered, the camera 121 is activated to emphasize user's convenience. As soon as or after entering the water mode, the controller 180 can control a gallery application of images, which were acquired by the camera 121 and then saved in the memory 160, to be activated.

In the water mode, if a frequency spectrum of an audio inputted through the microphone 122 meets a specific condition, the controller 180 maintains a water mode state. If the specific condition is not met, the controller 180 can enter to the normal mode for activating the touch control function of the touchscreen 151. That is, as the controller 180 had started in normal mode, if the specific condition is not met, the controller 180 can return to the normal mode for activating the touch control function of the touchscreen 151. When a portion of the touchscreen 151 comes in contact with water by user's mistake, if the water mode is entered, it may be different from user's intention. Hence, it is double checked whether the mobile terminal 100 is in the water environment using the microphone 122. In doing so, since it may happen that the touch control function malfunctions in the water contacted region on the touchscreen 151, the controller 180 can be designed to analyze the frequency spectrum of the audio inputted through the microphone after entering the water mode. A frequency spectrum of audio underwater differs from that in air due to the properties of medium. To this end, data for analyzing an audio spectrum difference between air and water can be saved in the memory 160 in advance.

The controller 180 controls a test audio to be outputted through the audio output unit 152 and is then able to determine whether a frequency spectrum of the test audio inputted through the microphone 122 meets the specific condition. In doing so, since the controller 180 can be aware of information on the test audio outputted through the audio output unit 152, the controller 180 can more accurately determine whether the mobile terminal 100 is in the water environment by analyzing a variation level of the frequency spectrum of the test audio inputted through the microphone 122.

The controller 180 periodically monitors the capacitance value detected through the touchscreen 151 in the water mode state as well.

In the water mode, if at least one of a size of the capacitance value detected through the touchscreen 151 and a variation of the per-region capacitance value detected through the touchscreen 151 meets a second condition, the controller 180 can return to the normal mode for activating the touch control function of the touchscreen 151.

In this case, the second condition may include one of a condition that a capacitance of each prescribed region on the touchscreen 151 is equal to or greater than a preset value, a condition that a capacitance difference between prescribed regions on the touchscreen 151 is equal to or greater than a preset value, and a condition that a difference between a capacitance value of a region having a maximum capacitance and a capacitance value of a region having a minimum capacitance value among prescribed regions on the touchscreen 151 is equal to or greater than a preset value. If the touchscreen 151 does not come in contact with water in general cases, capacitance values of the regions on the touchscreen 151 are not evenly distributed in a prescribed range.

In the water mode, the controller 180 may maintain the water mode if the second condition is met in the course of activation of a specific function. For instance, if a user is shooting a video or taking images consecutively using the camera 121 while getting in and out of water, the user may get out of the water for a while. In doing so, as the second condition is met, if the water mode is released, it may not be intended by the user. In particular, the user may set whether to manually cancel the water mode or automatically cancel the water mode in accordance with the second condition in advance. If the activation of the specific function is complete and the second condition is met, the controller 180 may be designed to return to the normal mode.

If the water mode is entered, the controller 180 controls a main home screen to be displayed, controls a screen corresponding to a function of a preset specific function to be displayed, or controls a screen corresponding to a screen right before entering the water mode to be displayed, for example.

If the controller 180 returns to the normal mode from the water mode, the controller 180 controls a main home screen to be displayed, controls a screen corresponding to a function of a preset specific function to be displayed, or controls a screen corresponding to a screen right before returning to the normal mode from the water mode to be displayed, for example.

In the water mode, the controller 180 can control a graphic user interface (hereinafter abbreviated GUI) corresponding to the water mode to be displayed. In the water mode, since the touch control function of the touchscreen 151 is disabled (deactivated) and it is difficult to secure user's visibility underwater, a graphic user interface simpler than that in the normal mode can be displayed.

In the following description, embodiments of the present invention are explained with reference to the accompanying drawings.

Figure 4:
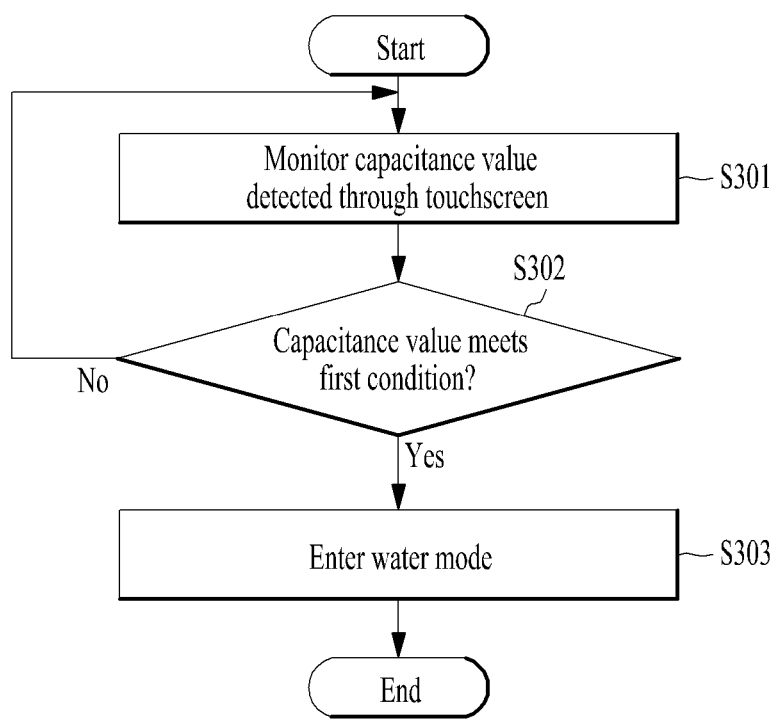
FIG. 4 is a flowchart for one example of a method of entering a water mode according to one embodiment of the present invention.

FIG. 4 is a flowchart for one example of a method of entering a water mode according to one embodiment of the present invention.

Referring to FIG. 4, the controller 180 monitors a capacitance value detected through the touchscreen 151 [S301]. In order to analyze a presence or non-presence of a touch to the touchscreen 151, an operation in response to the touch and the like, the controller 180 can periodically monitor the capacitance value detected through the touchscreen 151.

The controller 180 determines whether the capacitance value detected through the touchscreen 151 meets a first condition [S302]. In order to determine whether the first condition is met, the controller 180 can determine whether a capacitance of each prescribed region on the touchscreen 151 is equal to or smaller than a preset value, whether a capacitance difference between prescribed regions on the touchscreen 151 is equal to or smaller than a preset value, whether a difference between a capacitance value of a region having a maximum capacitance and a capacitance value of a region having a minimum capacitance value among prescribed regions on the touchscreen 151 is equal to or smaller than a preset value, and the like.

If the capacitance value detected through the touchscreen 151 meets the first condition, the controller 180 enters a water mode for disabling (deactivating) the touch control function of the touchscreen 151 [S303].

On the other hand, according to the present invention, in addition to the determination on whether the capacitance value detected through the touchscreen 151 meets the first condition, it is also able to check whether the mobile terminal 100 is in the water environment by analyzing a frequency spectrum of an audio inputted through the microphone 122. This is described in detail with reference to FIG. 5 as follows.

Figure 5:
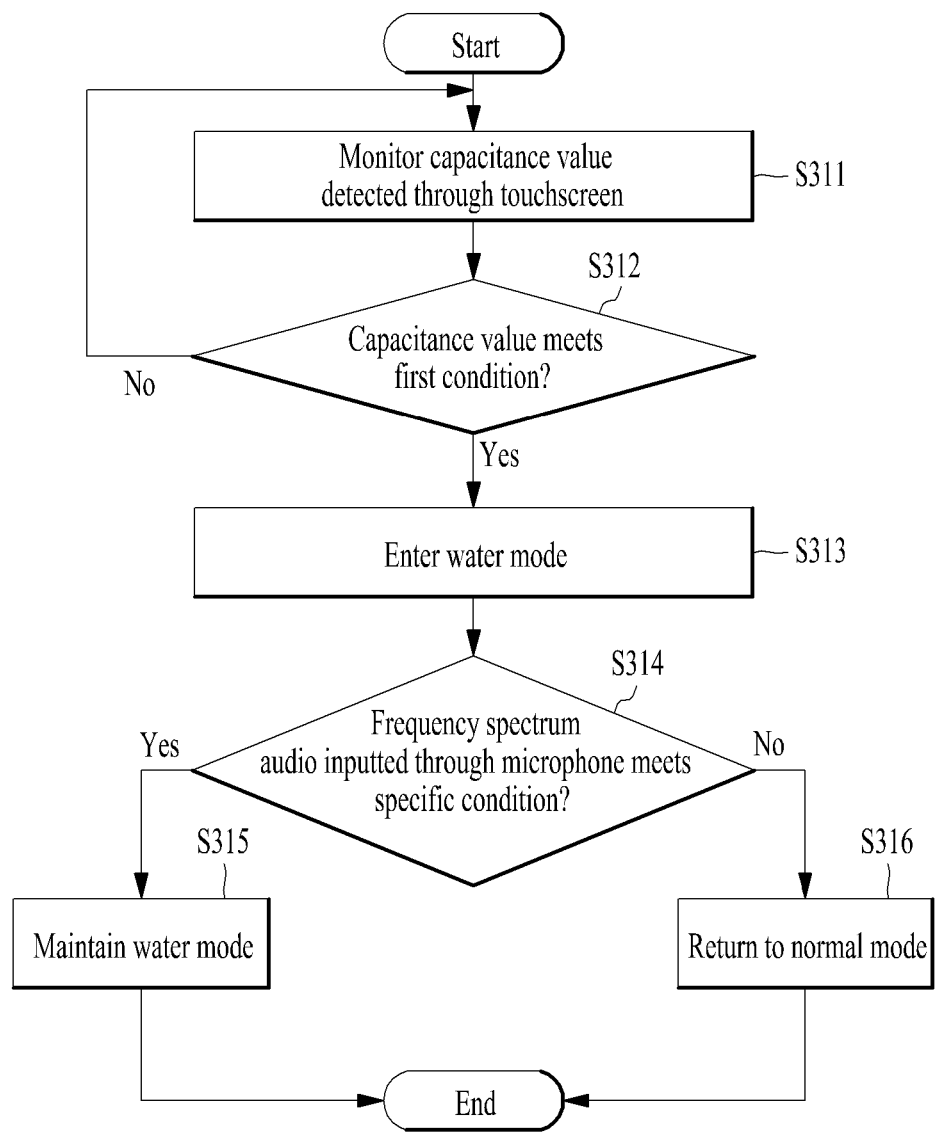
FIG. 5 is a flowchart for another example of a method of entering a water mode according to one embodiment of the present invention.

FIG. 5 is a flowchart for another example of a method of entering a water mode according to one embodiment of the present invention.

Referring to FIG. 5, the controller monitors a capacitance value detected through the touchscreen 151 [S311] and then determines whether the capacitance value detected through the touchscreen 151 meets a first condition [S312].

If the capacitance value detected through the touchscreen 151 meets the first condition, the controller 180 enters a water mode for disabling a touch control function of the touchscreen 151 [S313].

The controller 180 activates the microphone 122 and then determines whether a frequency spectrum of an audio inputted through the microphone 122 meets a specific condition [S314]. In this case, the specific condition is previously set by analyzing the properties of the frequency spectrum of the audio varying underwater in comparison with those in the air. If the frequency spectrum of the audio meets the specific condition, the controller 180 can determine that the mobile terminal 100 is in the water environment.

If the frequency spectrum of the audio inputted through the microphone 122 meets the specific condition, the controller 180 maintains a state of the water mode [S315]. In this case, the controller 180 may be designed to keep determining whether the specific condition is met in a manner of analyzing the frequency spectrum of the audio inputted through the microphone 122 by prescribed intervals.

If the frequency spectrum of the audio inputted through the microphone 122 does not meet the specific condition, the controller 180 returns to a normal mode from the water mode [S316]. In doing so, the controller 180 disables the microphone 122 and activates the touch control function of the touchscreen 151.

Meanwhile, according to the present invention, after a test audio has been outputted, it is able to check whether the mobile terminal 100 is in a water environment by analyzing a frequency spectrum of the text audio inputted through the microphone 122. This is described in detail with reference to FIG. 6 as follows.

Figure 6:
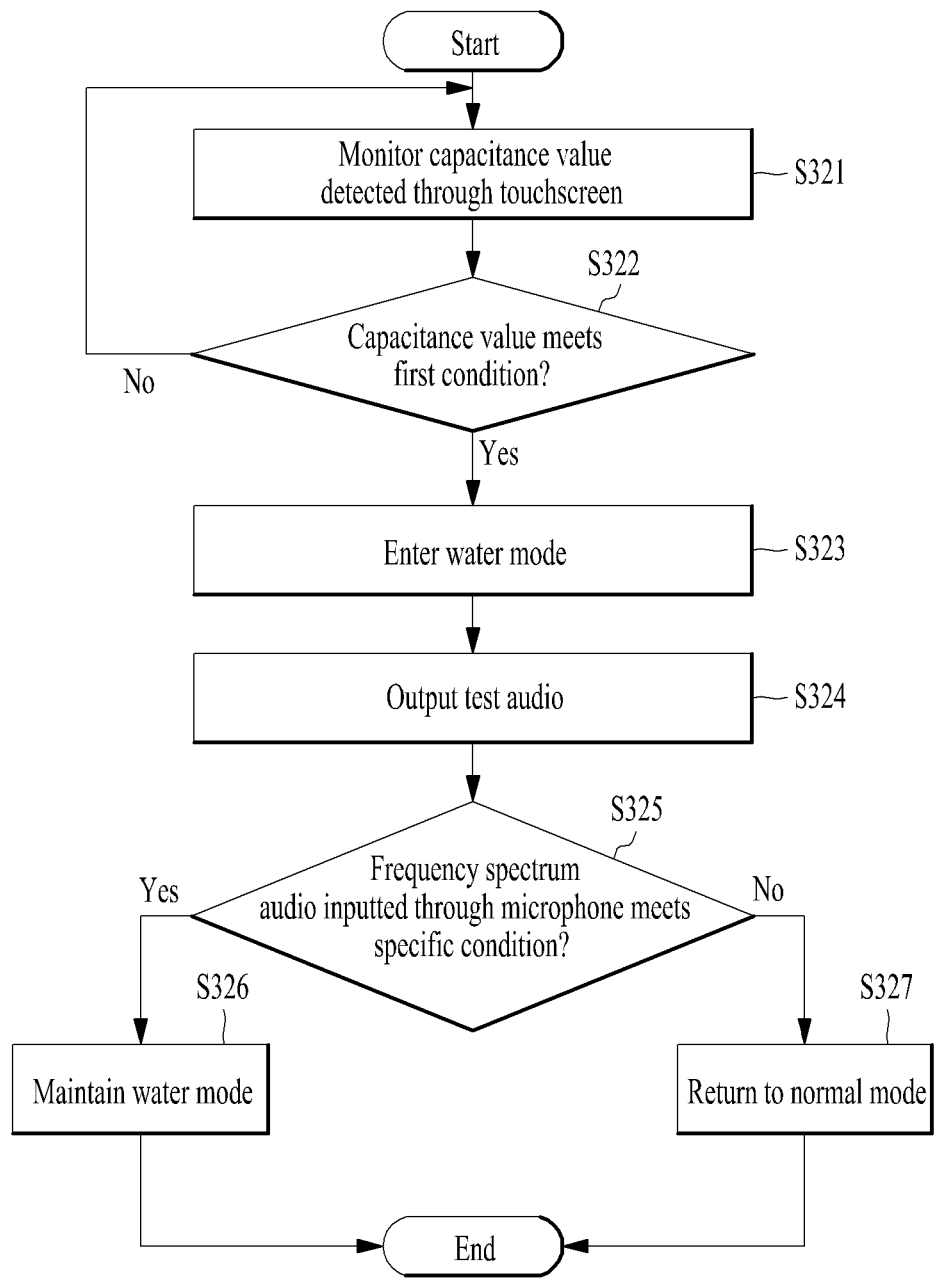
FIG. 6 is a flowchart for further example of a method of entering a water mode according to one embodiment of the present invention.

FIG. 6 is a flowchart for further example of a method of entering a water mode according to one embodiment of the present invention.

Referring to FIG. 6, the controller monitors a capacitance value detected through the touchscreen 151 [S321] and then determines whether the capacitance value detected through the touchscreen 151 meets a first condition [S322].

If the capacitance value detected through the touchscreen 151 meets the first condition, the controller 180 enters a water mode for disabling a touch control function of the touchscreen 151 [S323].

The controller 180 activates the audio output unit 152 and then controls the audio output unit 152 to output a test audio [S324].

The controller 180 activates the microphone 122 and then determines whether a frequency spectrum of the test audio inputted through the microphone 122 meets a specific condition [S325]. In this case, since the controller 180 can be aware of information on the test audio outputted through the audio output unit 152, the controller 180 can more accurately determine whether the mobile terminal 100 is in a water environment by analyzing a variation level of the frequency spectrum of the test audio inputted through the microphone 122.

If the frequency spectrum of the test audio inputted through the microphone 122 meets the specific condition, the controller 180 maintains a state of the water mode [S326]. In this case, the controller 180 may be designed to keep determining whether the specific condition is met in a manner of analyzing the frequency spectrum of the audio inputted through the microphone 122 by prescribed intervals.

If the frequency spectrum of the audio inputted through the microphone 122 does not meet the specific condition, the controller 180 returns to a normal mode from the water mode [S327]. In doing so, the controller 180 disables the microphone 122 and activates the touch control function of the touchscreen 151.

Figure 7:
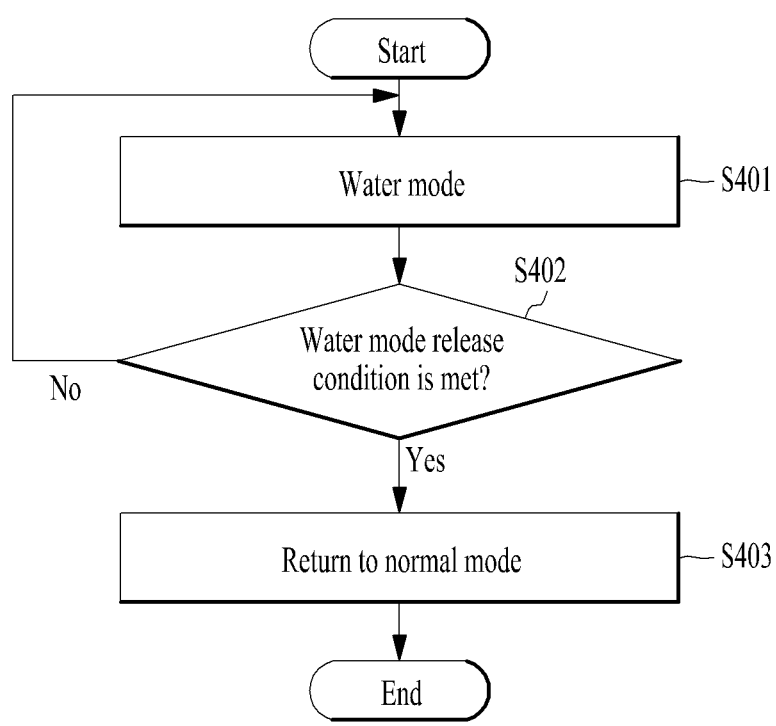
FIG. 7 is a flowchart for one example of a method of returning to a normal mode from a water mode according to one embodiment of the present invention.

FIG. 7 is a flowchart for one example of a method of returning to a normal mode from a water mode according to one embodiment of the present invention.

Referring to FIG. 7, if the controller 180 enters a water mode by one of the methods described with reference to FIGS. 4 to 6 or a user's manual setting, the controller 180 controls the mobile terminal 100 to be maintained in a water mode state [S401]. The controller periodically monitors a capacitance value detected through the touchscreen 151 in the water mode state.

The controller 180 detects whether a water mode release condition is met [S402]. If the water mode release condition is met, the controller 180 returns to a normal mode from the water mode [S403].

If the water mode release condition is met, it may correspond to a case that a user command for releasing the water mode is detected or a case that the capacitance value detected through the touchscreen 151 meets a second condition. Since the case of detecting the user command for releasing the water mode corresponds to a general case, the case that the capacitance value detected through the touchscreen 151 meets the touchscreen 151 is intensively described as follows.

First of all, in the step S402, the controller 180 determines whether the capacitance value detected through the touchscreen 151 meets the second condition as a result of the monitoring. In order to determine whether the second condition is met, the controller 180 can determine whether a capacitance of each prescribed region on the touchscreen 151 is equal to or smaller than a preset value, whether a capacitance difference between prescribed regions on the touchscreen 151 is equal to or smaller than a preset value, whether a difference between a capacitance value of a region having a maximum capacitance and a capacitance value of a region having a minimum capacitance value among prescribed regions on the touchscreen 151 is equal to or smaller than a preset value, and the like.

In some cases, if the preset value used for the determination on whether the second condition is met is equal to a preset value used for the determination on whether the first condition is met, the second condition may include one of a condition that a capacitance of each prescribed region on the touchscreen 151 is equal to or greater than a preset value, a condition that a capacitance difference between prescribed regions on the touchscreen 151 is equal to or greater than a preset value, and a condition that a difference between a capacitance value of a region having a maximum capacitance and a capacitance value of a region having a minimum capacitance value among prescribed regions on the touchscreen 151 is equal to or greater than a preset value.

If the capacitance value detected through the touchscreen 151 meets the second condition, the controller 180 returns to the normal mode for activating a touch control function of the touchscreen 151.

Meanwhile, according to the present invention, while a specific function is active, if the second condition is met, the state of the water mode can be maintained until the activation of the specific function is complete. This is described with reference to FIG. 8 as follows.

Figure 8:
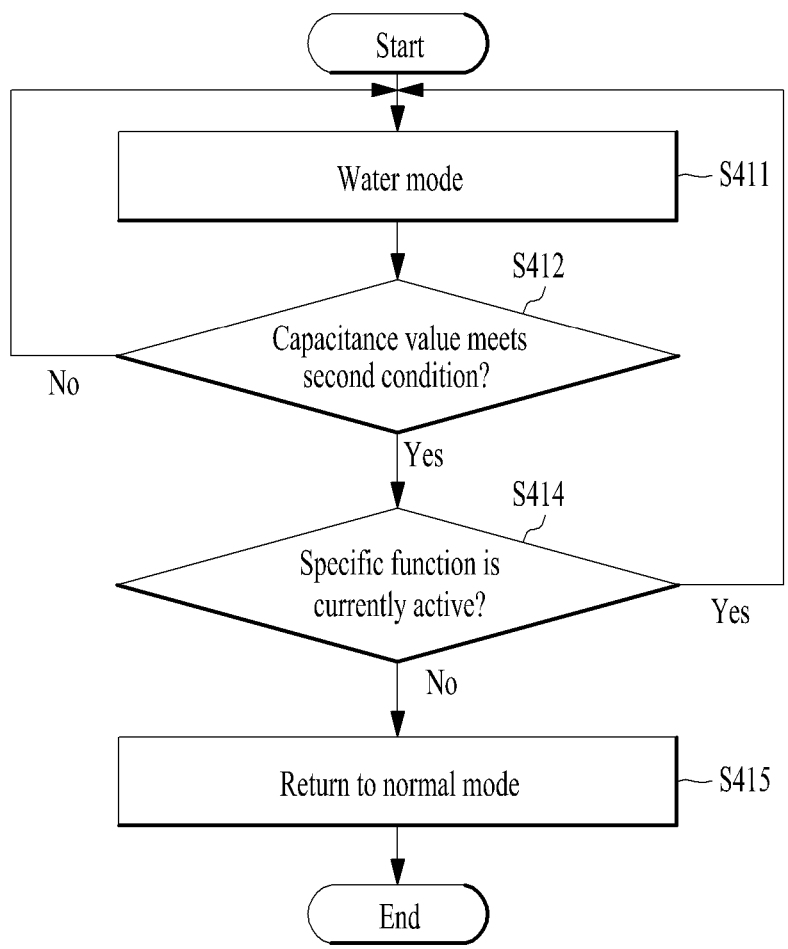
FIG. 8 is a flowchart for another example of a method of returning to a normal mode from a water mode according to one embodiment of the present invention.

FIG. 8 is a flowchart for another example of a method of returning to a normal mode from a water mode according to one embodiment of the present invention.

Referring to FIG. 8, if the controller 180 enters a water mode by one of the methods described with reference to FIGS. 4 to 6 or a user's manual setting, the controller 180 controls the mobile terminal 100 to be maintained in a water mode state [S411]. The controller periodically monitors a capacitance value detected through the touchscreen 151 in the water mode state.

The controller 180 determines whether a capacitance value detected through the touchscreen 151 meets a second condition [S412].

If the capacitance value detected through the touchscreen 151 meets the second condition, the controller 180 detects whether a currently active specific function exists [S414]. In this case, the specific function may mean a specific function of a specific application. For instance, if a preview state is entered as an application related to the camera 121 is activated, if a video shooting is being performed using the camera 121, or if still images are being consecutively taken using the camera 121, the controller 180 can detect that the specific function is active.

If the specific function is not currently active, the controller 180 returns to a normal mode from the water mode [S415].

On the contrary, if the specific function is currently active, the controller 180 maintains the water mode state [S411] and determines whether the second condition is met by periodically monitoring the capacitance value detected through the touchscreen 151 [S412].

As a result of the determination, if the second condition is met but the specific function is not currently active, the controller 180 returns to the normal mode from the water mode [S415].

In the following description, a user experience and user interface for enhancing user's convenience in a water environment shall be explained in detail with reference to the accompanying drawings.

First of all, the controller 180 can control a graphic user interface corresponding to a water environment to be displayed in the water mode. In the water mode, since a touch control function of the touchscreen 151 is disabled and it is difficult to secure user's visibility, a graphic user interface simpler than that of a normal mode is provided.

Figure 9:
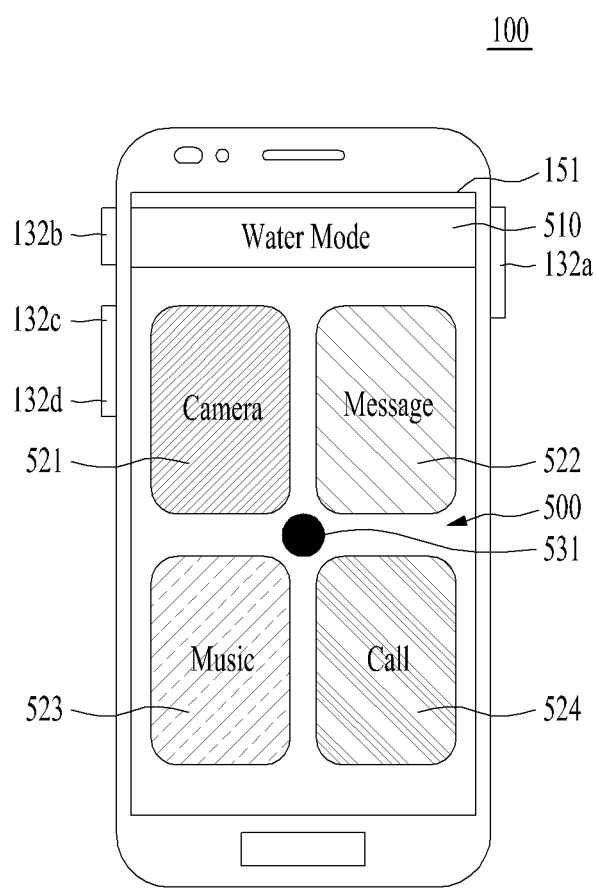
FIG. 9 is a diagram for one example of a graphic user interface displayed on a touchscreen in water mode according to one embodiment of the present invention.

FIG. 9 is a diagram for one example of a graphic user interface displayed on a touchscreen in water mode according to one embodiment of the present invention.

Referring to FIG. 9, in water mode, the controller 180 controls a graphic user interface 500 corresponding to the water environment to be displayed.

In this case, the graphic user interface 500 may include an information region 510 indicating that a current mode is set to the water mode.

The graphic user interface 500 includes graphic images corresponding to functions and/or applications, which can be implemented in the water mode, of the mobile terminal. For instance, the graphic user interface 500 can include a first graphic image 521 corresponding to a camera function, a second graphic image 522 corresponding to a message function, a third graphic image 523 corresponding to a music play function and a fourth graphic image 524 corresponding to a call (or phone) function. In particular, subfunctions may be included in the function corresponding to each of the graphic images. For instance, the camera function corresponding to the first graphic image 521 may include subfunctions corresponding to a still image photographing function, a video shooting function, a consecutive photographing function, a still image/video photographing mode switching function and the like.

The graphic user interface 500 may further include an indicator 531 that can be shifted and displayed on the graphic user interface 500. In particular, a size, shape, color and the like of the indicator 531 can be changed in various ways of implementations.

The mobile terminal 100 includes a plurality of keys 132a to 132d as the user input unit 130. In this case, a plurality of the keys 132a to 132d can be commonly named a key. Since a touch control function of the touchscreen 151 is disabled in water mode, a user can input a user command through the key 132. In particular, locations and the number of the keys 132 may vary in accordance with an embodiment. For example, the keys 132a to 132d can be hardware keys.

If an application including a plurality of functions is activated in water mode, the controller 180 can give at least one portion of a plurality of the functions to the key 132.

For instance, a first key 132a may be mapped to an on/off function of the touchscreen 151, a second key 132b may be mapped to an activation function of a specific function or menu, a third key 132c may be mapped to a function of a shift between menus, and a fourth key 132d may be mapped to an escape function for escaping from a specific function or menu.

The graphic user interface 500 shown in FIG. 9 may include a main home screen displayed on the touchscreen 151 in water mode.

Meanwhile, according to the present invention, if a water mode is entered, it is able to implement the mobile terminal to activate a specific application or a specific function. This is described with reference to FIG. 10 as follows.

Figure 10:
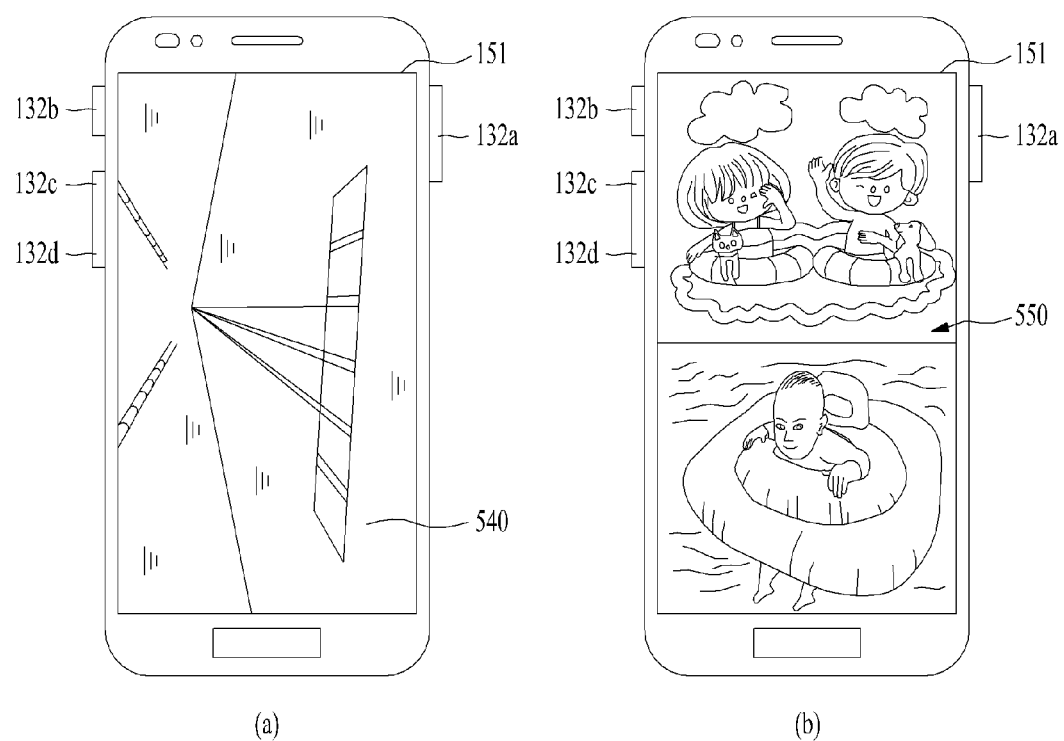
FIG. 10 is a diagram foe examples of screens of a touchscreen displayed in water mode according to one embodiment of the present invention.

FIG. 10 is a diagram foe examples of screens of a touchscreen displayed in water mode according to one embodiment of the present invention.

Referring to FIG. 10, as soon as or after entering a water mode, the controller 180 can control a specific application or a specific function to be activated. For instance, as soon as or after entering the water mode, the controller 180 may control the camera 121 to be activated or control a gallery application of still images/videos, which were previously saved by the camera 121 and then saved in the memory 160, to be activated, by which the present invention may be non-limited.

FIG. 10 (a) shows a preview screen 540 of the camera 121 displayed on the touchscreen 151 as the camera 121 is activated in case of entering a water mode. It is unnecessary for a user to separately activate an application related to the camera 121 in case of entering the water mode. The user can photograph a still image or video using a key 132 in the state shown in FIG. 10 (a) and is then able to appreciate the photographed still image or video.

FIG. 10 (b) shows a gallery screen 550 displayed on the touchscreen 151 as a gallery application of still images/videos saved in the memory 160 in case of entering a water mode. A user can appreciate the previously saved still images/videos using a key 132 in the state shown in FIG. 10 (b). In doing so, the controller 180 can control a plurality of still images saved in the memory 160 or a plurality of still images, which were photographed and saved in the water mode among a plurality of the still images saved in the memory 160, to be automatically displayed as a slide show. Moreover, since it is difficult to secure user's visibility in the water mode, the still image or video can be displayed after adjusting screen brightness or resolution in case of playing the still image or video.

When a water mode is entered, what kind of application or function will be activated can be previously set and saved by a user.

Meanwhile, according to the present invention, using a key, it is able to output a guide message informing user that functions corresponding to an application currently active in water mode. This is described with reference to FIG. 11 as follows.

Figure 11:
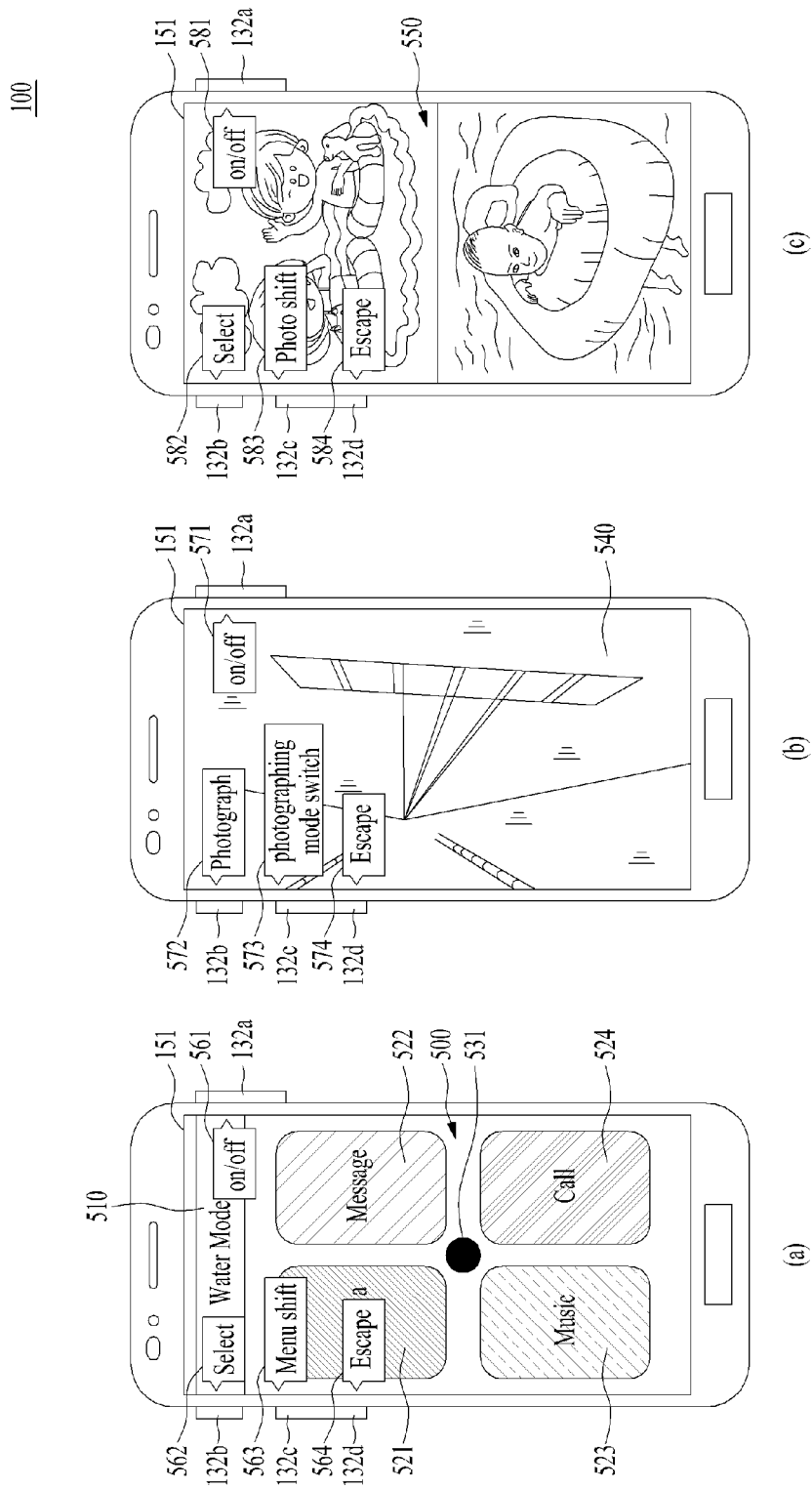
FIG. 11 is a diagram foe examples of a guide message outputted to a touchscreen in water mode according to one embodiment of the present invention.

FIG. 11 is a diagram foe examples of a guide message outputted to a touchscreen in water mode according to one embodiment of the present invention.

Referring to FIG. 11, the controller 180 can control the touchscreen 151 to output a guide message information a user that functions corresponding to an application currently active in water mode can be manipulated using a key 132. The user obtains which one of a plurality of keys 132a to 132d is mapped to a prescribed function of the currently active application through the guide message and is then able to input a desired user command through the key 132.

FIG. 11 (a) shows one example of a main home screen displayed on the touchscreen 151 in water mode. When a water mode is entered, the controller 180 controls a graphic image 500, which corresponds to the main home screen in the water mode, to be displayed on the touchscreen 151 and also controls guide messages 561 to 564, which inform the user of the functions mapped to the key 132, to be displayed on the graphic image 500.

For instance, the first guide message 561 indicates that it is able to select on/off of the touchscreen 151 by manipulating the first key 132a, the second guide message 562 indicates that an activation of a specific function or menu can be selected through the second key 132b, the third guide message 563 indicates that an inter-menu shift can be enabled through the third key 132c, and the fourth guide message 564 indicates that it is able to escape from the water mode through the fourth key 132d. The guide messages 561 to 564 can be removed after being displayed for prescribed duration from the timing point of entering the water mode. In some cases, such a visual effect as a flickering for prescribed duration and the like can be given thereto. The guide messages 561 to 564 are displayed only if entering the water mode initially. Thereafter, if the water mode is reentered from a normal mode, the guide messages 561 to 564 may not be displayed.

FIG. 11 (b) shows one example of a preview screen 540 of the camera 121 displayed on the touchscreen 151 if an application related to the camera 121 is activated in water mode. If the camera 121 is set to be activated in case of entering the water mode, the controller 180 controls the preview screen 540 to be displayed in case of entering the water mode. If a user activates the camera related application after entering the water mode, the controller 180 controls the preview screen 540 to be displayed. And, the controller 180 controls guide messages 571 to 574, which inform the user of the functions mapped to the key 132, to be displayed on the preview screen 540.

For instance, the first guide message 571 indicates that it is able to select on/off of the touchscreen 151 by manipulating the first key 132a, the second guide message 572 indicates that a still image or video can be photographed through the second key 132b, the third guide message 573 indicates that an inter-mode shift between a still image photographing mode and a video shooting mode can be enabled through the third key 132c, and the fourth guide message 574 indicates that it is able to escape from the camera related application through the fourth key 132d. The guide messages 571 to 574 can be removed after being displayed for prescribed duration from the timing point of entering the camera related application. In some cases, such a visual effect as a flickering for prescribed duration and the like can be given thereto. The guide messages 571 to 574 are displayed only if entering the camera related application initially. Thereafter, if the camera related application is reentered from a previously active application, the guide messages 571 to 574 may not be displayed.

FIG. 11 (c) shows one example of a gallery screen 550 displayed on the touchscreen 151 if a gallery application is activated in water mode. If the gallery application is set to be activated in case of entering the water mode, the controller 180 controls the gallery screen 550 to be displayed in case of entering the water mode. If a user activates the gallery application after entering the water mode, the controller 180 controls the gallery screen 550 to be displayed. And, the controller 180 controls guide messages 581 to 584, which inform the user of the functions mapped to the key 132, to be displayed on the gallery screen 540.

For instance, the first guide message 581 indicates that it is able to select on/off of the touchscreen 151 by manipulating the first key 132a, the second guide message 582 indicates that a desired still image or video can be selected through the second key 132b, the third guide message 583 indicates that an inter-still image shift between still images or an inter-video shift between videos can be enabled through the third key 132c, and the fourth guide message 584 indicates that it is able to escape from the gallery application through the fourth key 132d. The guide messages 581 to 584 can be removed after being displayed for prescribed duration from the timing point of entering the gallery application. In some cases, such a visual effect as a flickering for prescribed duration and the like can be given thereto. The guide messages 581 to 584 are displayed only if entering the gallery application initially. Thereafter, if the gallery application is reentered from a previously active application, the guide messages 581 to 584 may not be displayed.

The examples shown in FIG. 11 are described with reference to the three screens. And, it is apparent to those skilled in the art that, if another application is activated in water mode, a guide message can be outputted to inform a user that functions included in the activated application can be manipulated through a key 132.

In the following description, a method for inter-menu shift and menu selection in a graphic user interface 500 displayed on the touchscreen 151 in water mode is explained with reference to FIGS. 12 to 16.

Figure 12:
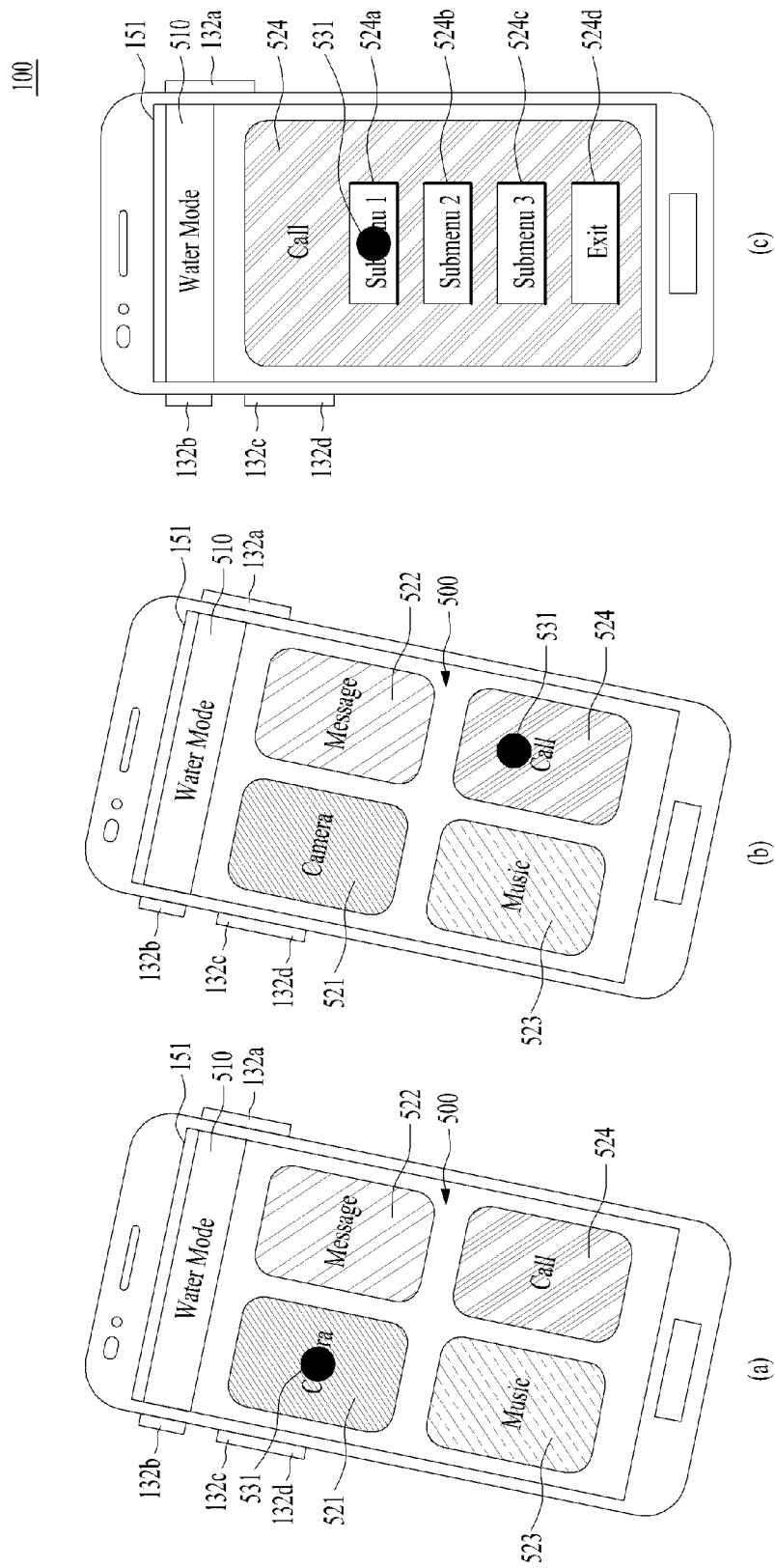
FIG. 12 is a diagram for one example of a method for inter-menu shift and menu selection in a graphic user interface displayed on a touchscreen in water mode according to one embodiment of the present invention.

FIG. 12 is a diagram for one example of a method for inter-menu shift and menu selection in a graphic user interface displayed on a touchscreen in water mode according to one embodiment of the present invention.

Referring to FIG. 12, in water mode, the controller 180 controls a graphic user interface 500 corresponding to the water environment to be displayed. The graphic user interface 500 includes graphic images corresponding to functions and/or applications, which can be implemented in the water mode, of the mobile terminal 100. For instance, the graphic user interface 500 can include a first graphic image 521 corresponding to a camera function, a second graphic image 522 corresponding to a message function, a third graphic image 523 corresponding to a music play function and a fourth graphic image 524 corresponding to a call (or phone) function. The graphic user interface 500 may further include an indicator 531 that can be shifted and displayed on the graphic user interface 500.

Referring to FIG. 12 (a), when a water mode is entered, the indicator 531 may be displayed on the first graphic image 521 located in the first place of the graphic user interface 500, by which the present invention may be non-limited. A case that a user intends to activate the call function by shifting the indicator 531 displayed on the first graphic image 521 onto the fourth graphic image 524 corresponding to the call function is explained as an example.

The mobile terminal 100 includes the sensing unit 140 that includes at least one of a gyroscope sensor, an acceleration sensor and a geomagnetic sensor. The sensing unit 140 generates a sensing signal by detecting a motion or action of the mobile terminal 100 through at least one of the gyroscope sensor, the acceleration sensor and the geomagnetic sensor.

The controller 180 controls the indicator 531 to be displayed on the graphic user interface 500 in a manner of being shifted on the graphic user interface 500 in response to the sensing signal.

The user can shift the indicator 531 displayed on the first graphic image 521 onto the fourth graphic image 524 by inclining the mobile terminal 100 in a desired direction [FIG. 12 (b)]. In doing so, the controller 180 can control the indicator 531 to be displayed in a manner that a location of the indicator 531 displayed on the first graphic image 521 is continuously changed in response to the sensing signal of the sensing unit 140. Alternatively, the controller 180 can control the indicator 531 to be displayed in a manner that a location of the indicator 531 displayed on the first graphic image 521 is dispersedly changed onto the second image 522 from the first graphic image 521 and onto the fourth image 524 from the second image 522.

If a user command is received through the second key 132b in the screen shown in FIG. 12 (B), referring to FIG. 12 (c), the controller 180 activates the call function corresponding to the fourth graphic image 524.

Referring to FIG. 12 (c), subfunctions are included in the call function corresponding to the fourth graphic image 524 and a plurality of graphic images 524a to 524d respectively corresponding to the subfunctions are displayed. When a call function menu is entered, the indicator 531 may be displayed on the first located graphic image 524a. In case of selecting the subfunctions included in the call function, the above-described method can be similarly applied.

Meanwhile, according to the present invention, an inter-menu shift in a graphic image 500 displayed on the touchscreen 151 can be performed in water mode in response to a user command inputted through a key 132. This is described in detail with reference to FIG. 13 and FIG. 14 as follows.

Figure 13:
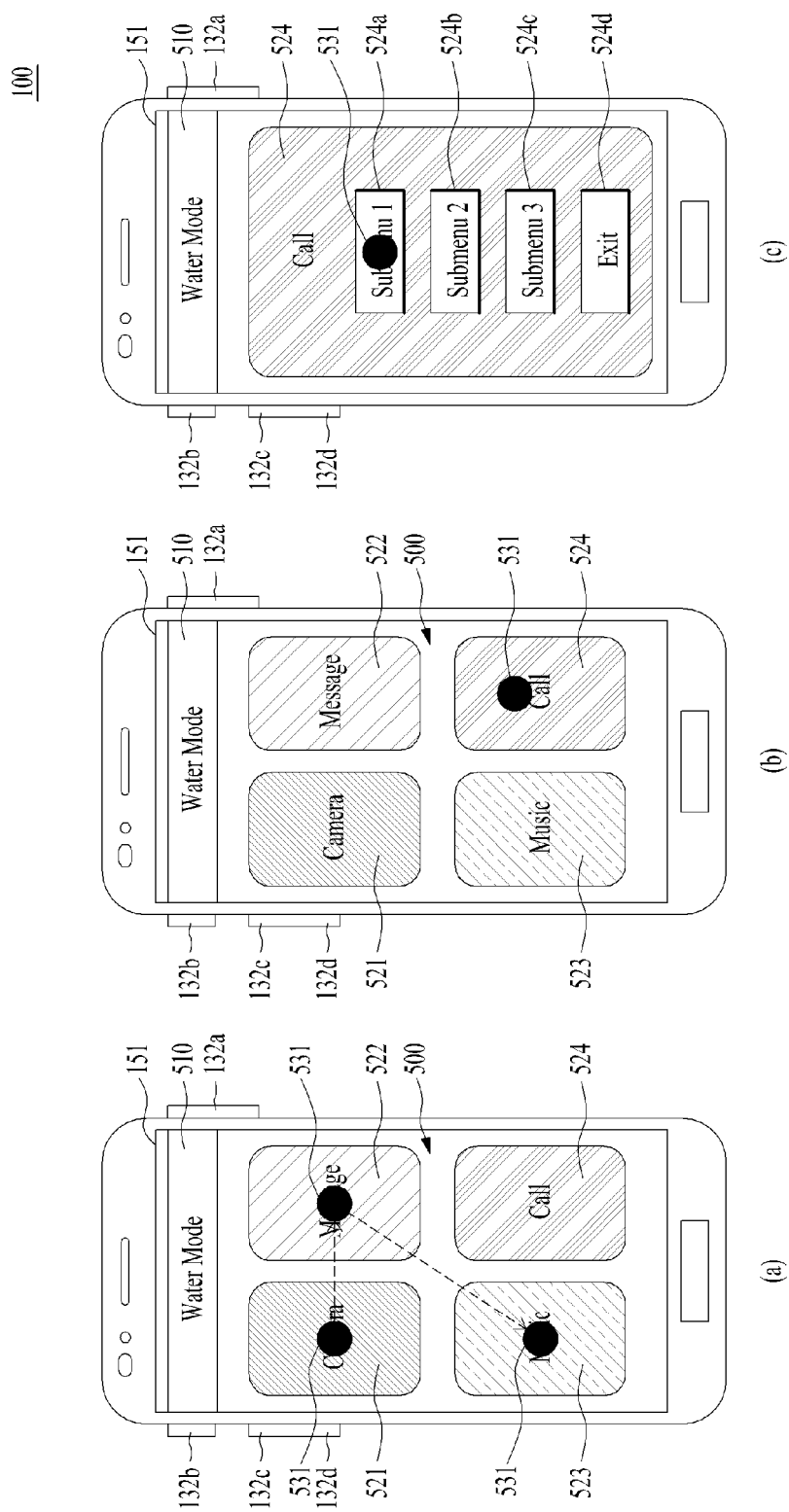
FIG. 13 is a diagram for another example of a method for inter-menu shift and menu selection in a graphic user interface displayed on a touchscreen in water mode according to one embodiment of the present invention.

FIG. 13 is a diagram for another example of a method for inter-menu shift and menu selection in a graphic user interface displayed on a touchscreen in water mode according to one embodiment of the present invention.

Referring to FIG. 13, a graphic user interface 500 includes graphic images corresponding to functions and/or applications, which can be implemented in the water mode, of the mobile terminal 100. For instance, the graphic user interface 500 can include a first graphic image 521 corresponding to a camera function, a second graphic image 522 corresponding to a message function, a third graphic image 523 corresponding to a music play function and a fourth graphic image 524 corresponding to a call (or phone) function. The graphic user interface 500 may further include an indicator 531 that can be shifted and displayed on the graphic user interface 500.

If a specific user command is received through a key 132, the controller 180 controls the indicator 531 to be shifted and displayed on the graphic user interface 500 in response to the specific user command.

Referring to FIG. 13 (a) and FIG. 13 (b), a user can shift the indicator 531 displayed on the first graphic image 521 onto the fourth graphic image 524 using a third key 132c. For instance, the user shifts the indicator 531 onto the second graphic image 522 from the first graphic image 521 by pressing the third key 132c once, shifts the indicator 531 onto the third graphic image 523 from the second graphic image 522 by pressing the third key 132c once again, and then shifts the indicator 531 onto the fourth graphic image 524 from the third graphic image 523 by pressing the third key 132c once again.

If a user command is received through a second key 132b in the screen shown in FIG. 13 (b), referring to FIG. 13 (b), the controller 180 activates the call function corresponding to the fourth graphic image 524.

Figure 14:
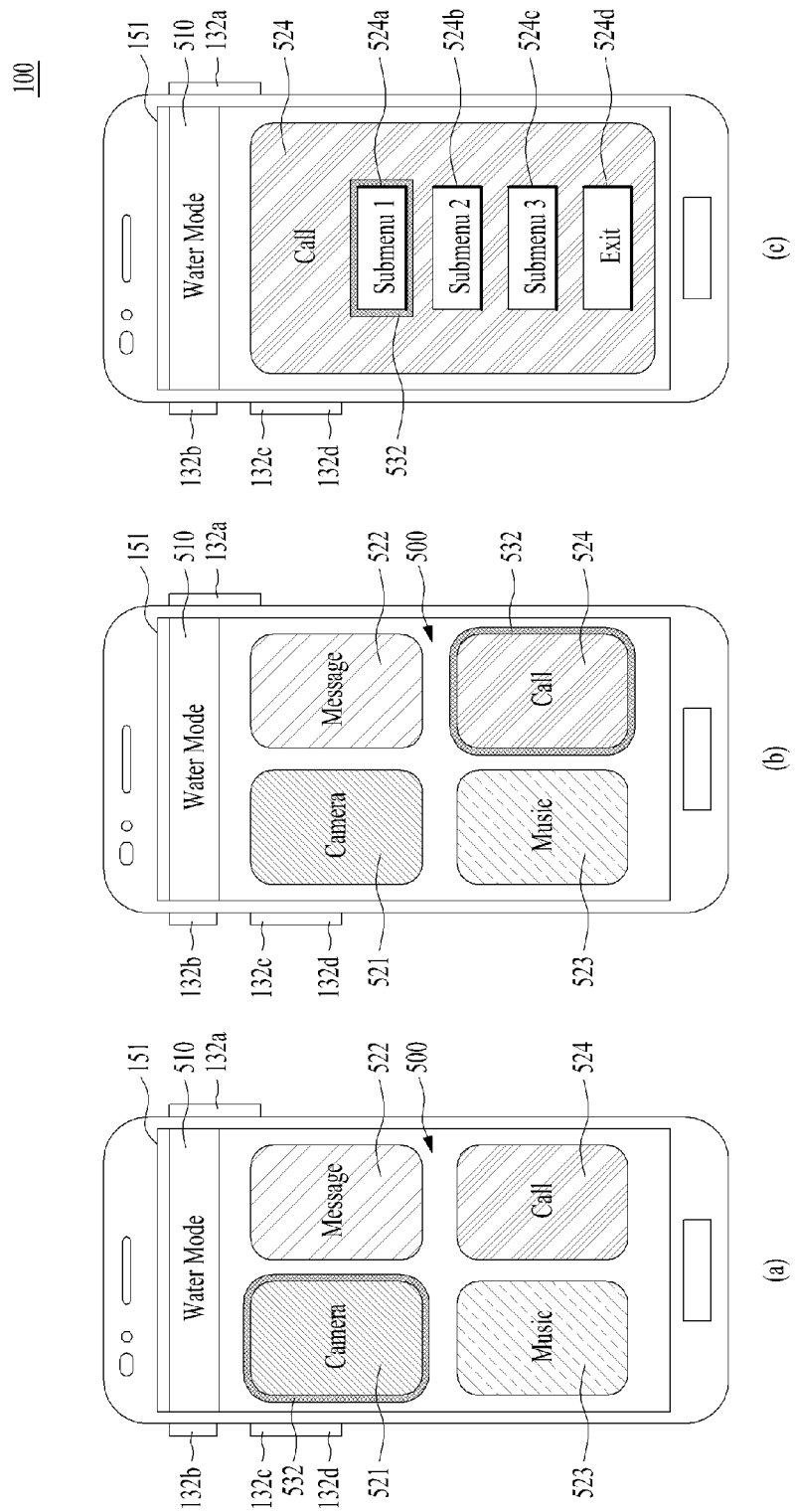
FIG. 14 is a diagram for further example of a method for inter-menu shift and menu selection in a graphic user interface displayed on a touchscreen in water mode according to one embodiment of the present invention.

FIG. 14 is a diagram for further example of a method for inter-menu shift and menu selection in a graphic user interface displayed on a touchscreen in water mode according to one embodiment of the present invention.

First of all, the embodiment shown in FIG. 14 differs from that shown in FIG. 13 in that an indicator 532 is displayed in a manner of highlighting an outline of a graphic image.

Since the description with reference to FIG. 14 is similar to the former description with reference to FIG. 13 except that the indicator 532 is displayed in a manner of highlighting an outline of a corresponding graphic image and being shifted between graphic images adjacent to each other, in response to a user command received through a third key 132c, its details shall be omitted from the following description.

Meanwhile, according to the present invention, a user can clearly recognize an inter-menu shift in a water environment in which it is difficult to secure user's visibility. This is described with reference to FIG. 15 and FIG. 16 as follows.

Figure 15:
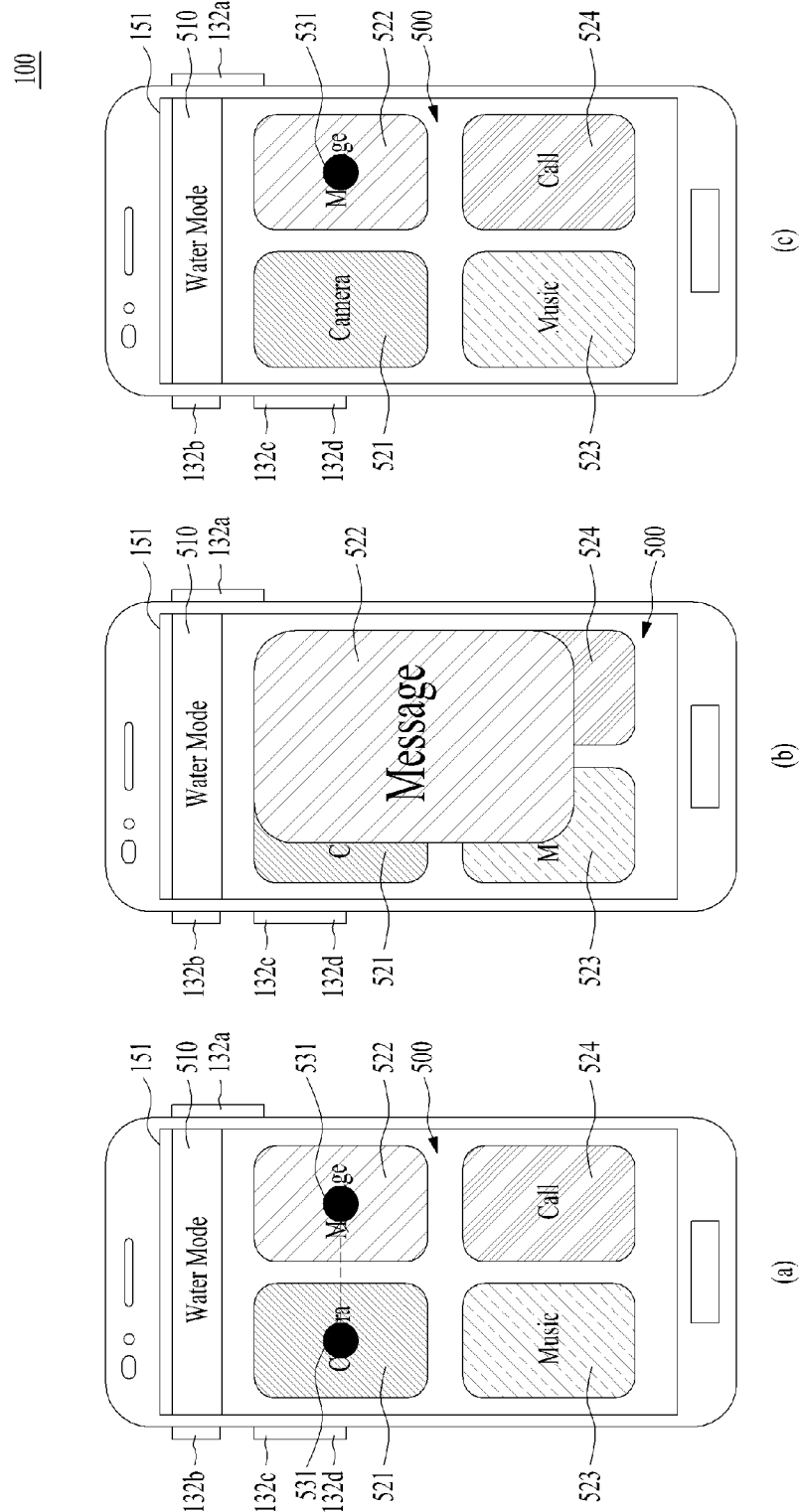
FIG. 15 is a diagram for one example of a method for a user to clearly recognize an inter-menu shift and menu selection in a graphic user interface displayed on a touchscreen in water mode according to one embodiment of the present invention.

FIG. 15 is a diagram for one example of a method for a user to clearly recognize an inter-menu shift and menu selection in a graphic user interface displayed on a touchscreen in water mode according to one embodiment of the present invention.

Referring to FIG. 15, in water mode, the controller 180 controls a graphic user interface 500 corresponding to the water environment to be displayed. The graphic user interface 500 includes graphic images corresponding to functions and/or applications, which can be implemented in the water mode, of the mobile terminal 100. For instance, the graphic user interface 500 can include a first graphic image 521 corresponding to a camera function, a second graphic image 522 corresponding to a message function, a third graphic image 523 corresponding to a music play function and a fourth graphic image 524 corresponding to a call (or phone) function. The graphic user interface 500 may further include an indicator 531 that can be shifted and displayed on the graphic user interface 500.

The controller 180 controls the indicator 531 to be shifted and displayed on the graphic user interface 500 in response to a sensing signal of the sensing unit 140 or a user command inputted through a key 132. In doing so, if the indicator 531 is shifted from one graphic image onto another graphic image, the controller 180 can control another graphic image to be displayed in a manner that a size of the corresponding graphic image is changed.

For instance, when the indicator 531 is shifted onto the second graphic image 522 from the first graphic image 521, referring to FIG. 15 (b), the controller 180 can control the second graphic image 522 to be enlarged and displayed as an intermediate step in a process for completely shifting the indicator 531 onto the second graphic image 522 from the first graphic image 521. Underwater, it is difficult to secure user's visibility and a user does not wear swimming goggles usually. Hence, if a graphic image shift-targeted by a user is enlarged and displayed momentarily, the user can clearly recognize the inter-menu shift underwater.

If the indicator 531 is completely shifted onto the second graphic image 522 from the first graphic image 521, referring to FIG. 15 (c), the controller 180 can control the second graphic image 522 to be displayed in a manner of returning to its original size.

Moreover, the controller 180 can control the indicator located graphic image to be enlarged and displayed. For instance, when the indicator 531 is displayed on the first graphic image 531, the controller 180 controls the first graphic image 531 to be enlarged and displayed. If the indicator 531 is shifted onto the second graphic image 532 from the first graphic image 531, the controller 180 can control the touchscreen 151 to enlarge and display the second graphic image 532.

Figure 16:
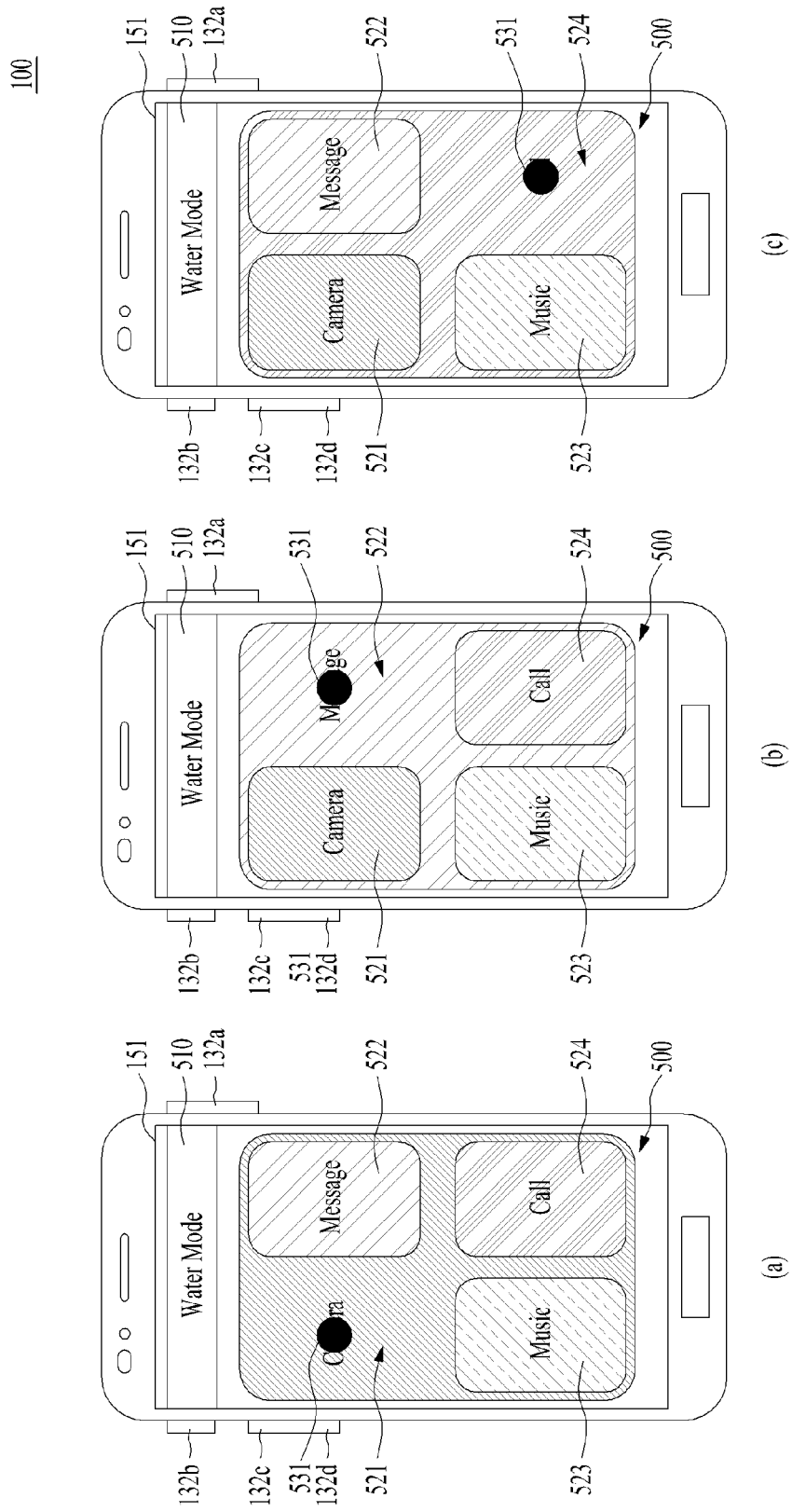
FIG. 16 is a diagram for another example of a method for a user to clearly recognize an inter-menu shift and menu selection in a graphic user interface displayed on a touchscreen in water mode according to one embodiment of the present invention.

FIG. 16 is a diagram for another example of a method for a user to clearly recognize an inter-menu shift and menu selection in a graphic user interface displayed on a touchscreen in water mode according to one embodiment of the present invention.

Referring to FIG. 16, in water mode, the controller 180 controls a graphic user interface 500 corresponding to the water environment to be displayed. The graphic user interface 500 includes graphic images corresponding to functions and/or applications, which can be implemented in the water mode, of the mobile terminal 100. For instance, the graphic user interface 500 can include a first graphic image 521 corresponding to a camera function, a second graphic image 522 corresponding to a message function, a third graphic image 523 corresponding to a music play function and a fourth graphic image 524 corresponding to a call (or phone) function. The graphic user interface 500 may further include an indicator 531 that can be shifted and displayed on the graphic user interface 500.

A plurality of the graphic images included in the graphic user interface 500 can be displayed in different background colors, respectively. For instance, the first graphic image 521 is displayed in a first background color, the second graphic image 522 is displayed in a second background color, the third graphic image 523 is displayed in a third background color, and the fourth graphic image 524 is displayed in a fourth background color.

In response to a sensing signal of the sensing unit 140 or a user command inputted through a key 132, the controller 180 controls the indicator 531 to be shifted and displayed on the graphic user interface 500. In doing so, the controller 180 can control the background colors of the graphic images, at which the indicator 531 is not located, to be changed into the background color of the graphic image having the indicator 531 located thereat. Underwater, it is difficult to secure user's visibility and a user does not wear swimming goggles usually. Hence, if the background colors of other graphic images are changed into the background color of the graphic image shift-targeted by a user, the user can clearly recognize the inter-menu shift underwater.

Referring to FIG. 16, the controller 180 can control the background of the graphic user interface 500, in accordance with the first graphic image 521, the second graphic image 522, the third graphic image 523 or the fourth graphic image 524, when the indicator 531 is located over the respective graphic image. For instance, as illustrated in FIG. 16(a), if the indicator 531 is located over the first graphic image 521 ("Camera"), the color of the graphic user interface 500 changes to the color of the first graphic image 521. Thus, in FIG. 16(a), the color associated with the first graphic image 521 and the graphic user interface 500 appear to blend together. As illustrated in FIG. 16(b), if the indicator 531 is located over the second graphic image 522 ("Message"), the color of the graphic user interface 500 changes to the color of the second graphic image 522. Thus, in FIG. 16(b), the color associated with the second graphic image 522 and the graphic user interface 500 appear to blend together. As illustrated in FIG. 16(c), if the indicator 531 is located over the fourth graphic image 524 ("Call"), the color of the graphic user interface 500 changes to the color of the fourth graphic image 524. Thus, in FIG. 16(c), the color associated with the fourth graphic image 524 and the graphic user interface 500 appear to blend together.

In addition to the method for inter-menu shift and menu selection described with reference to FIGS. 12 to 16, in order for a user to clearly recognize the inter-menu shift, when the inter-menu shift and/or the menu selection is performed, the controller 180 can control a specific audio to be outputted through the audio output unit 152 or control various haptic effects to be outputted through the haptic module 154.

In the following description, one example of an implementing method in case of receiving a call signal in water mode is explained in detail with reference to FIG. 17.

Figure 17:
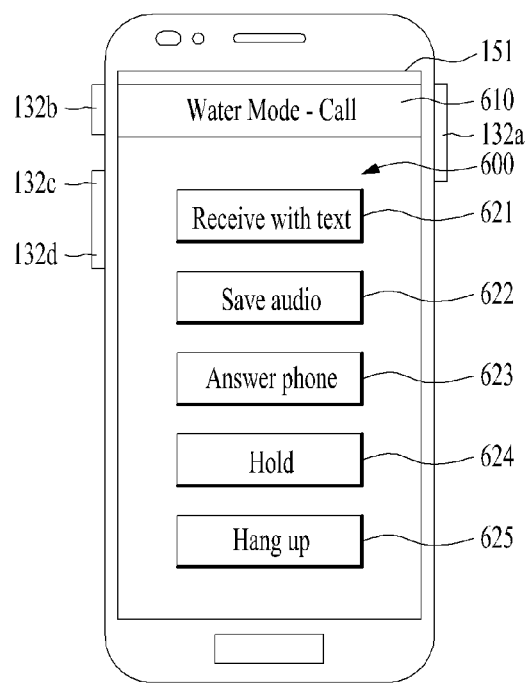
FIG. 17 is a diagram for one example of a graphic user interface displayed on a touchscreen in case of receiving a call signal in water mode according to one embodiment of the present invention.

FIG. 17 is a diagram for one example of a graphic user interface displayed on a touchscreen in case of receiving a call signal in water mode according to one embodiment of the present invention.

Referring to FIG. 17, if a call signal is received in water mode, the controller 180 controls a graphic user interface 600 to be displayed.

In this case, the graphic user interface 600 may include an information region 610 indicating that a current mode is set to the water mode and that the call signal is received.

The graphic user interface 600 includes graphic images corresponding to functions that can be implemented in the mobile terminal 100 in case of receiving the call signal in the water mode. For instance, the graphic user interface 600 can include a first graphic image 621 corresponding to a text receiving function, a second graphic image 622 corresponding to an audio saving function, a third graphic image 623 corresponding to a normal call answering function, a fourth graphic image 624 corresponding to a holding function, and a fifth graphic image 625 corresponding to a hang-up function.

If the first graphic image 621 is selected, the controller 180 controls a specific audio or text to be delivered to a counterpart and controls the specific audio or text to be outputted from the mobile terminal 100. For instance, the specific audio or text may contain a content 'if you speak, I can listen to despite working on something.' Moreover, if the second graphic image 622 is selected, the controller 180 controls a specific audio or text to be delivered to a counterpart and controls and controls an audio of the counterpart to be saved in the memory 160. For example, the specific audio or text may contain a content 'Please, speak for recording because I'm working on something.' Moreover, if the third graphic image 623 is selected, the controller 180 can enter a call mode like a normal call answering. Moreover, if the fourth graphic image 624 is selected, the controller 180 can control a call signal reception sound or vibration to be disabled. Moreover, if the fifth graphic image 625 is selected, the controller 180 can control a call signal reception to be stopped.

Since a method for a user to select one of the first to fifth graphic images 621 to 625 is applicable in a manner similar to the former methods described with reference to FIGS. 12 to 16, its details shall be omitted from the following description.

In the following description, one example of an implementing method in case of activating a music play application in water mode is explained in detail with reference to FIG. 18.

Figure 18:
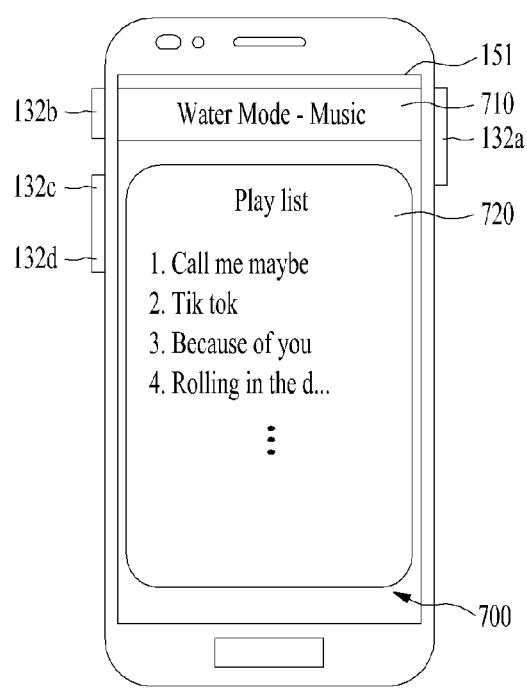
FIG. 18 is a diagram for one example of a graphic user interface displayed on a touchscreen in case of activating a music play application in water mode according to one embodiment of the present invention.

FIG. 18 is a diagram for one example of a graphic user interface displayed on a touchscreen in case of activating a music play application in water mode according to one embodiment of the present invention.

Referring to FIG. 18, if a music play application is activated in water mode, the controller 180 controls a graphic user interface 700 to be displayed.

The graphic user interface 700 may include an information 710 indicating that a current mode of the graphic user interface 700 is set to a water mode and that the music play application is currently active.

The graphic user interface 700 can display a list 720 of playable music files.

In response to a user command inputted through a key 132, the controller 180 can activate such a function as a function of selecting a music file, a function of playing a music file, a function of stopping playing a music file and the like. For instance, a first key 132a is mapped to the music play stopping function, a second key 132b is mapped to the music play function, a third key 132c is mapped to a function of a shift to a music file existing on an upper part of the list 720 of the playable music files, and a fourth key 132d is mapped to a function of a shift to a music file existing on a lower part of the list 720 of the playable music files. In some cases, a long press of the first key 132a may be mapped to an on/off function of the touchscreen 151 and a long press of the second key 132b may be mapped to a function of escaping from the music play application.

When a shift between music files and/or a selection of a music file is performed, the controller 180 can control a specific audio to be outputted through the audio output unit 152 or controls various haptic effects to be outputted through the haptic module 154. And, the controller 180 can control a prescribed indicator to be displayed to enable a user to recognize the selected music file.

Meanwhile, according to the present invention, an activation result of a specific application or function activated in water mode can be saved as a separate folder. This is described in detail with reference to FIG. 19 as follows.

FIG. 19 is a diagram to describe one example for a method of managing an activation result of an application or specific function previously activated in water mode by saving the activation result as a separate folder.

Referring to FIG. 19 (a), the controller 180 controls an activation result of a specific application or function activated in water mode to be saved and managed as a separate folder 810.

In the folder 810, referring to FIG. 19 (b), a plurality of subfolders 821 to 823 sorted by dates and times for operating the mobile terminal 100 in the water mode may exist.

For instance, if the first folder 821 is selected, referring to FIG. 19 (c), there may exist a plurality of subfolders 831 to 833, in which activation results of specific applications or functions activated in the water mode corresponding to corresponding times of corresponding dates are saved in a manner of being sorted by applications or specific functions, respectively. For instance, in the first subfolder 812, a subfolder 831 related to a still image file, a subfolder 832 related to a video file, a subfolder 833 related to a call history and the like may exist, by which the present invention may be non-limited.

A user selects the subfolder 831 and is then able to check the still images photographed and saved in the water mode corresponding to the corresponding time of the corresponding date. A user selects the subfolder 832 and is then able to check the videos photographed and saved in the water mode corresponding to the corresponding time of the corresponding date. And, a user selects the subfolder 833 and is then able to check the call history in the water mode corresponding to the corresponding time of the corresponding date.

According to the present embodiment, an activation result of a specific application or function activated in water mode is saved and managed as a separate folder, whereby user's convenience can be enhanced.

Accordingly, embodiments of the present invention provide various effects and/or features.

First of all, a mobile terminal according to one embodiment of the present invention automatically enters a water mode by periodically monitoring a capacitance value of a touchscreen, thereby enhancing user's convenience.

Secondly, a mobile terminal according to one embodiment of the present invention implements a user experience and user interface for enhancing user's convenience in water environment.

Effects obtainable from the present invention may be non-limited by the above mentioned effect. And, other unmentioned effects can be clearly understood from the following description by those having ordinary skill in the technical field to which the present invention pertains.

It will be appreciated by those skilled in the art that the present invention can be specified into other form(s) without departing from the spirit or scope of the inventions.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A mobile terminal comprising:
an electrostatic touchscreen; and
a controller configured to enter a water mode, in which a touch control function of the touchscreen is deactivated, when a capacitance value detected through the touchscreen or a variation of a per-region capacitance value detected through the touchscreen meets a first condition, wherein the first condition is met when at least one of the following is detected:
capacitance of each prescribed region on the touch screen is equal to or smaller than a preset value,
a capacitance difference between prescribed regions on the touchscreen is less than or equal to a preset value and
a difference between a capacitance value of a region having a maximum capacitance value and a capacitance value of a region having a minimum capacitance value among the prescribed regions on the touchscreen is less than or equal to a preset value,
wherein when the capacitance value detected through the touchscreen or the variation of a per-region capacitance value detected through the touchscreen meets a second condition, the controller is configured to enter a normal mode in which the touch control function of the touchscreen is activated, and
wherein when the second condition is met while a specific function is currently active in the water mode, the controller is further configured to maintain the state of the mobile terminal in the water mode.

2. The mobile terminal of claim 1, wherein the second condition comprises at least one of a condition that a capacitance of each prescribed region on the touchscreen is equal to or greater than a preset value, a condition that a capacitance difference between prescribed regions on the touchscreen is equal to or greater than a preset value, and a condition that a difference between a capacitance value of a region having a maximum capacitance and a capacitance value of a region having a minimum capacitance value among prescribed regions on the touchscreen is equal to or greater than a preset value.

3. The mobile terminal of claim 1, wherein if the specific function is deactivated, the controller is configured to enter the normal mode.

4. The mobile terminal of claim 1, further comprising a camera, wherein if the water mode is entered, the controller controls the camera to be activated.

5. The mobile terminal of claim 1, further comprising a microphone, wherein if a frequency spectrum of an audio input through the microphone in the water mode meets a specific condition, the controller maintains a state of the water mode and wherein if the frequency spectrum does not meet the specific condition, the controller enters a normal mode in which the touch control function of the touchscreen is activated.

6. The mobile terminal of claim 5, further comprising an audio output unit, wherein the controller controls a test audio to be output through the audio output unit and wherein the controller determines whether a frequency spectrum of the test audio inputted through the microphone meets the specific condition.

7. The mobile terminal of claim 1, wherein the controller controls a graphic user interface corresponding to the water mode to be displayed in the water mode.

8. The mobile terminal of claim 7, wherein the graphic user interface comprises a first graphic image corresponding to a first function, a second graphic image corresponding to a second function, and an indicator.

9. The mobile terminal of claim 8, further comprising a sensing unit having at least a gyroscope sensor, an acceleration sensor, or a geomagnetic sensor, wherein the controller controls the indicator to be shifted and displayed on the graphic user interface in response to a sensing signal of the sensing unit.

10. The mobile terminal of claim 8, further comprising a key, wherein if a first user command is received through the key, the controller controls the indicator to shift onto the second graphic image from the first graphic image.

11. The mobile terminal of claim 10, wherein if a second user command is received through the key while the indicator is displayed on the second graphic image, the controller activates the second function.

12. The mobile terminal of claim 1, further comprising a plurality of keys, wherein if an application including a plurality of functions is activated in the water mode, the controller assigns at least one portion of the plurality of functions to the plurality of keys.

13. The mobile terminal of claim 8, wherein if the indicator is shifted onto the second graphic image from the first graphic image, the controller controls the second graphic image to change size.

14. The mobile terminal of claim 8, wherein the first graphic image is displayed in a first background color, wherein the second graphic image is displayed in a second background color, wherein if the indicator is displayed on the first graphic image, the controller controls a background screen of the graphic user interface to be displayed in a manner of being changed into the first background color, and wherein if the indicator is displayed on the second graphic image, the controller controls the background screen of the graphic user interface to be displayed in a manner of being changed into the second background color.

15. The mobile terminal of claim 1, further comprising a plurality of keys, wherein the controller controls a display of information indicating functions corresponding to the plurality of keys to be displayed if the mobile terminal is in the water mode.

16. A method of controlling a mobile terminal, comprising the steps of:
    determining whether a capacitance value detected through a touchscreen or a variation of a per-region capacitance value detected through the touchscreen meets a first condition; and
    if the first condition is met as a result of the determining step, entering a water mode in which a touch control function of the touchscreen is deactivated, wherein the first condition is met when at least one of the following is detected:
    a capacitance of each prescribed region on the touchscreen is equal to or smaller than a preset value,
    a capacitance difference between prescribed regions on the touchscreen is less than or equal to a preset value and
    a difference between a capacitance value of a region having a maximum capacitance value and a capacitance value of a region having a minimum capacitance value among the prescribed regions on the touchscreen is less than or equal to a preset value,
    wherein when the capacitance value detected through the touchscreen or the variation of a per-region capacitance value detected through the touchscreen meets a second condition, the controller is configured to enter a normal mode in which the touch control function of the touchscreen is activated, and
    wherein when the second condition is met while a specific function is currently active in the water mode, the controller is further configured to maintain the state of the mobile terminal in the water mode.

17. The method of claim 16, further comprising the steps of:
    outputting a test audio through an audio output unit;
    determining whether a frequency spectrum of the test audio input through a microphone meets a second condition;
    if the second condition is met as a result of the determining step, maintaining a state of the water mode; and
    if the second condition is not met as the result of the determining step, entering a state of a normal mode in which the touch control function of the touchscreen is activated.

* * * * *